United States Patent
Assouad et al.

(10) Patent No.: US 11,029,056 B2
(45) Date of Patent: Jun. 8, 2021

(54) AUTOMATIC SWITCHOVER THERMOSTAT SYSTEM BASED ON APPARENT TEMPERATURE AND METHOD FOR DETERMINING AND AUTOMATICALLY CONTROLLING THE APPARENT TEMPERATURE OF A CONDITIONED SPACE

(71) Applicants: Bechara Philippe Assouad, Ashrafieh (LB); Dimitri S. Chamieh, Pasadena, CA (US)

(72) Inventors: Bechara Philippe Assouad, Ashrafieh (LB); Dimitri S. Chamieh, Pasadena, CA (US)

(73) Assignee: FRONTIERTECH INTERNATIONAL INC., Pasadena, CA (US)

( * ) Notice: Subject to any disclaimer, the term of this patent is extended or adjusted under 35 U.S.C. 154(b) by 86 days.

(21) Appl. No.: 16/158,154

(22) Filed: Oct. 11, 2018

(65) Prior Publication Data
US 2019/0107309 A1    Apr. 11, 2019

Related U.S. Application Data

(60) Provisional application No. 62/570,835, filed on Oct. 11, 2017.

(51) Int. Cl.
*F24F 11/67*      (2018.01)
*F24F 11/80*      (2018.01)
(Continued)

(52) U.S. Cl.
CPC ............ *F24F 11/67* (2018.01); *F24F 11/523* (2018.01); *F24F 11/80* (2018.01); *G05D 22/02* (2013.01);
(Continued)

(58) Field of Classification Search
CPC ......... F24F 11/67; F24F 11/523; F24F 11/80; F24F 2110/10; F24F 2110/20; G05D 22/02; G05D 23/1919; G05D 27/02
See application file for complete search history.

(56) References Cited

U.S. PATENT DOCUMENTS

| 4,557,317 A | * | 12/1985 | Harmon, Jr. | ....... | G05D 23/1902 165/201 |
| 4,616,325 A | * | 10/1986 | Heckenbach | ...... | G05D 23/1905 700/276 |

(Continued)

FOREIGN PATENT DOCUMENTS

| CN | 107166637 A | 9/2017 |
| JP | 2010266318 A | 11/2010 |

(Continued)

OTHER PUBLICATIONS

Anderson et.al. "Methods to Calculate the Heat Index as an Exposure Metric in Environmental Health Research", Environmental Health Perspectives vol. 121, No. 10, p. 111-1119, Oct. 2013 (Year: 2013).*

(Continued)

*Primary Examiner* — Bernard G Lindsay
(74) *Attorney, Agent, or Firm* — Lewis Roca Rothgerber Christie LLP

(57) ABSTRACT

A climate control unit configured to control a heating unit and a cooling unit. The climate control unit includes a temperature sensor configured to measure a current dry bulb temperature, a humidity sensor configured to measure a current relative humidity, a processor, and a storage medium operably coupled to the processor. The storage medium has software instructions stored therein, which, when executed by the processor, cause the processor to determine a current apparent temperature based on the current dry bulb temperature and the current relative humidity, receive a user- (Continued)

selected desired apparent temperature, activate a heating mode when the current apparent temperature is below a lower apparent temperature threshold, and activate a cooling mode when the current apparent temperature is above an upper apparent temperature threshold. The software instructions, when executed by the processor, cause the processor to automatically switch between the heating mode and the cooling mode.

27 Claims, 12 Drawing Sheets

(51) Int. Cl.
| | | |
|---|---|---|
| F24F 11/523 | (2018.01) | |
| G05D 27/02 | (2006.01) | |
| G05D 23/19 | (2006.01) | |
| G05D 22/02 | (2006.01) | |
| F24F 110/10 | (2018.01) | |
| F24F 110/20 | (2018.01) | |

(52) U.S. Cl.
CPC ......... *G05D 23/1919* (2013.01); *G05D 27/02* (2013.01); *F24F 2110/10* (2018.01); *F24F 2110/20* (2018.01)

(56) References Cited

U.S. PATENT DOCUMENTS

| | | | | |
|---|---|---|---|---|
| 5,737,934 | A * | 4/1998 | Shah | F24F 11/0008 165/223 |
| 6,012,296 | A | 1/2000 | Shah | |
| 2002/0166659 | A1 * | 11/2002 | Wagner | G05D 23/1919 165/254 |
| 2008/0256475 | A1 | 10/2008 | Amundson et al. | |
| 2011/0166712 | A1 * | 7/2011 | Kramer | G05D 23/1919 700/278 |
| 2011/0168792 | A1 | 7/2011 | Riley, Jr. | |
| 2012/0061068 | A1 * | 3/2012 | Anderson | F24F 11/30 165/254 |
| 2013/0087630 | A1 * | 4/2013 | Castillo | F24F 11/0008 236/44 C |
| 2014/0263678 | A1 | 9/2014 | Schnell et al. | |
| 2014/0277756 | A1 | 9/2014 | Bruce et al. | |
| 2014/0358294 | A1 | 12/2014 | Nichols et al. | |
| 2015/0203125 | A1 * | 7/2015 | Penilla | B60W 50/08 701/1 |
| 2016/0187899 | A1 * | 6/2016 | Lee | G05D 22/02 236/44 C |
| 2017/0211830 | A1 | 7/2017 | Kosaka et al. | |
| 2017/0268793 | A1 | 9/2017 | Cardonha et al. | |
| 2018/0156487 | A1 | 6/2018 | Beitelmal | |

FOREIGN PATENT DOCUMENTS

| | | |
|---|---|---|
| JP | 2014066432 A | 4/2014 |
| WO | WO 2015/014229 A1 | 2/2015 |
| WO | WO 2016/008431 A1 | 1/2016 |
| WO | WO 2018/117344 A1 | 6/2018 |

OTHER PUBLICATIONS

International Preliminary Report on Patentability for International Application No. PCT/US2018/055514, dated Dec. 13, 2019, 7 pages.
International Search Report and Written Opinion for International Application No. PCT/US2018/055514, dated Jan. 25, 2019, 11 pages.
https://web.archive.org/web/20170421115116/http://www.meteosuivialsace.fr/la-temperature-apparente/, 2 pages, retrieved Jan. 10, 2019.
https://www.azosensors.com/article.aspx?ArticleID=487, Publication date: May 14, 2014, Date Accessed: Sep. 27, 2018, 4 pages.
Steadman, "A Universal Scale of Apparent Temperature," Journal of Climate and Applied Meteorology, vol. 23, 14 pages, Dec. 1984.
Chinese Office action for Application No. 201880079797.5 dated Mar. 3, 2021, 22 pages.

* cited by examiner

FIG. 2A

APPARENT TEMPERATURE IN DEGREES CELSIUS

| DRY BULB TEMP. | RELATIVE HUMIDITY | | | | | | | | | |
|---|---|---|---|---|---|---|---|---|---|---|
| | 10.% | 20.% | 30.% | 40.% | 50.% | 60.% | 70.% | 80.% | 90.% | 100.% |
| 10.0 | 6.1 | 6.5 | 7.0 | 7.4 | 7.8 | 8.2 | 8.7 | 9.1 | 9.5 | 9.9 |
| 11.0 | 7.1 | 7.6 | 8.0 | 8.5 | 9.0 | 9.4 | 9.9 | 10.3 | 10.8 | 11.2 |
| 12.0 | 8.2 | 8.7 | 9.1 | 9.6 | 10.1 | 10.6 | 11.1 | 11.6 | 12.1 | 12.6 |
| 13.0 | 9.2 | 9.7 | 10.2 | 10.8 | 11.3 | 11.8 | 12.3 | 12.8 | 13.4 | 13.9 |
| 14.0 | 10.2 | 10.8 | 11.3 | 11.9 | 12.5 | 13.0 | 13.6 | 14.1 | 14.7 | 15.2 |
| 15.0 | 11.3 | 11.9 | 12.5 | 13.0 | 13.6 | 14.2 | 14.8 | 15.4 | 16.0 | 16.6 |
| 16.0 | 12.3 | 12.9 | 13.6 | 14.2 | 14.8 | 15.5 | 16.1 | 16.7 | 17.4 | 18.0 |
| 17.0 | 13.4 | 14.0 | 14.7 | 15.4 | 16.0 | 16.7 | 17.4 | 18.1 | 18.7 | 19.4 |
| 18.0 | 14.4 | 15.1 | 15.8 | 16.5 | 17.3 | 18.0 | 18.7 | 19.4 | 20.1 | 20.8 |
| 19.0 | 15.4 | 16.2 | 17.0 | 17.7 | 18.5 | 19.3 | 20.0 | 20.8 | 21.5 | 22.3 |
| 20.0 | 16.5 | 17.3 | 18.1 | 18.9 | 19.7 | 20.5 | 21.4 | 22.2 | 23.0 | 23.8 |
| 21.0 | 17.5 | 18.4 | 19.3 | 20.1 | 21.0 | 21.9 | 22.7 | 23.6 | 24.4 | 25.3 |
| 22.0 | 18.6 | 19.5 | 20.4 | 21.4 | 22.3 | 23.2 | 24.1 | 25.0 | 25.9 | 26.9 |
| 23.0 | 19.7 | 20.6 | 21.6 | 22.6 | 23.6 | 24.5 | 25.5 | 26.5 | 27.5 | 28.4 |
| 24.0 | 20.7 | 21.8 | 22.8 | 23.8 | 24.9 | 25.9 | 26.9 | 28.0 | 29.0 | 30.0 |
| 25.0 | 21.8 | 22.9 | 24.0 | 25.1 | 26.2 | 27.3 | 28.4 | 29.5 | 30.6 | 31.7 |
| 26.0 | 22.8 | 24.0 | 25.2 | 26.3 | 27.5 | 28.7 | 29.8 | 31.0 | 32.2 | 33.3 |
| 27.0 | 23.9 | 25.2 | 26.4 | 27.6 | 28.9 | 30.1 | 31.3 | 32.6 | 33.8 | 35.0 |
| 28.0 | 25.0 | 26.3 | 27.6 | 28.9 | 30.2 | 31.5 | 32.9 | 34.2 | 35.5 | 36.8 |
| 29.0 | 26.1 | 27.5 | 28.8 | 30.2 | 31.6 | 33.0 | 34.4 | 35.8 | 37.2 | 38.6 |
| 30.0 | 27.2 | 28.6 | 30.1 | 31.6 | 33.0 | 34.5 | 36.0 | 37.5 | 38.9 | 40.4 |
| 31.0 | 28.2 | 29.9 | 31.4 | 32.9 | 34.5 | 36.0 | 37.6 | 39.1 | 40.7 | 42.3 |
| 32.0 | 29.3 | 31.0 | 32.6 | 34.3 | 35.9 | 37.6 | 39.2 | 40.9 | 42.5 | 44.2 |
| 33.0 | 30.4 | 32.2 | 33.9 | 35.7 | 37.4 | 39.1 | 40.9 | 42.6 | 44.4 | 46.1 |

FIG. 2B

APPARENT TEMPERATURE IN FAHRENHEIT

| DRY BULB TEMP. | RELATIVE HUMIDITY | | | | | | | | | |
|---|---|---|---|---|---|---|---|---|---|---|
| | 10.% | 20.% | 30.% | 40.% | 50.% | 60.% | 70.% | 80.% | 90.% | 100.% |
| 50.0 | 43.0 | 43.8 | 44.5 | 45.3 | 46.1 | 46.8 | 47.6 | 48.4 | 49.1 | 49.9 |
| 51.8 | 44.8 | 45.7 | 46.5 | 47.3 | 48.1 | 48.9 | 49.8 | 50.6 | 51.4 | 52.2 |
| 53.6 | 46.7 | 47.6 | 48.5 | 49.3 | 50.2 | 51.1 | 52.0 | 52.8 | 53.7 | 54.6 |
| 55.4 | 48.6 | 49.5 | 50.4 | 51.4 | 52.3 | 53.2 | 54.2 | 55.1 | 56.1 | 57.0 |
| 57.2 | 50.4 | 51.4 | 52.4 | 53.4 | 54.4 | 55.4 | 56.4 | 57.4 | 58.4 | 59.4 |
| 59.0 | 52.3 | 53.4 | 54.4 | 55.5 | 56.6 | 57.6 | 58.7 | 59.8 | 60.8 | 61.9 |
| 60.8 | 54.2 | 55.3 | 56.4 | 57.6 | 58.7 | 59.8 | 61.0 | 62.1 | 63.3 | 64.4 |
| 62.6 | 56.0 | 57.2 | 58.5 | 59.7 | 60.9 | 62.1 | 63.3 | 64.5 | 65.7 | 66.9 |
| 64.4 | 57.9 | 59.2 | 60.5 | 61.8 | 63.1 | 64.4 | 65.7 | 66.9 | 68.2 | 69.5 |
| 66.2 | 59.8 | 61.2 | 62.5 | 63.9 | 65.3 | 6.7 | 68.0 | 69.4 | 70.8 | 72.2 |
| 68.0 | 61.7 | 63.1 | 64.6 | 66.1 | 67.5 | 69.0 | 70.5 | 71.9 | 73.4 | 74.8 |
| 69.8 | 63.6 | 65.1 | 66.7 | 68.2 | 69.8 | 71.3 | 72.9 | 74.5 | 76.0 | 77.6 |
| 71.6 | 65.5 | 67.1 | 68.8 | 70.4 | 72.1 | 73.7 | 75.4 | 77.0 | 78.7 | 80.3 |
| 73.4 | 67.4 | 69.1 | 70.9 | 72.6 | 74.4 | 76.2 | 77.9 | 79.7 | 81.4 | 83.2 |
| 75.2 | 69.3 | 71.2 | 73.0 | 74.9 | 76.7 | 78.6 | 80.5 | 82.3 | 84.2 | 86.1 |
| 77.0 | 71.2 | 73.2 | 75.2 | 77.1 | 79.1 | 81.1 | 83.1 | 85.1 | 87.0 | 89.0 |
| 78.8 | 73.1 | 75.2 | 77.3 | 79.4 | 81.5 | 83.6 | 85.7 | 87.8 | 89.9 | 92.0 |
| 80.6 | 75.1 | 77.3 | 79.5 | 81.7 | 84.0 | 86.2 | 88.4 | 90.6 | 92.9 | 95.1 |
| 82.4 | 77.0 | 79.3 | 81.7 | 84.1 | 86.4 | 88.8 | 91.1 | 93.5 | 95.9 | 98.2 |
| 84.2 | 78.9 | 81.4 | 83.9 | 86.4 | 88.9 | 91.4 | 93.9 | 96.4 | 98.9 | 101.4 |
| 86.0 | 80.9 | 83.5 | 86.2 | 88.8 | 91.5 | 94.1 | 96.8 | 99.4 | 102.1 | 104.7 |
| 87.8 | 82.8 | 85.6 | 88.4 | 91.2 | 94.0 | 96.9 | 99.7 | 102.5 | 105.3 | 108.1 |
| 89.6 | 84.8 | 87.8 | 90.7 | 93.7 | 96.7 | 99.6 | 102.6 | 105.6 | 108.5 | 111.5 |
| 91.4 | 86.8 | 89.9 | 93.0 | 96.2 | 99.3 | 102.5 | 105.6 | 108.7 | 111.9 | 115.0 |

FIG. 3A

DRY BULB TEMPERATURE IN CELSIUS / RELATIVE HUMIDITY

| °C \ RH | 10% | 15% | 20% | 25% | 30% | 35% | 40% | 45% | 50% | 55% | 60% | 65% | 70% | 75% | 80% | 85% | 90% | 95% | 100% |
|---|---|---|---|---|---|---|---|---|---|---|---|---|---|---|---|---|---|---|---|
| 15.6 | 19.2 | 18.8 | 18.4 | 18.1 | 17.7 | 17.4 | 17.1 | 16.8 | 16.5 | 16.3 | 16.0 | 15.8 | 15.6 | 15.4 | 15.2 | 15.1 | 15.0 | 14.8 | 14.7 |
| 16.1 | 19.7 | 19.3 | 18.9 | 18.6 | 18.2 | 17.9 | 17.6 | 17.3 | 17.0 | 16.7 | 16.5 | 16.2 | 16.0 | 15.8 | 15.6 | 15.5 | 15.3 | 15.2 | 15.1 |
| 16.7 | 20.3 | 19.8 | 19.4 | 19.1 | 18.7 | 18.4 | 18.0 | 17.7 | 17.4 | 17.2 | 16.9 | 16.7 | 16.4 | 16.2 | 16.0 | 15.9 | 15.7 | 15.6 | 15.5 |
| 17.2 | 20.8 | 20.4 | 20.0 | 19.6 | 19.2 | 18.8 | 18.5 | 18.2 | 17.9 | 17.6 | 17.3 | 17.1 | 16.9 | 16.6 | 16.4 | 16.3 | 16.1 | 16.0 | 15.8 |
| 17.8 | 21.3 | 20.9 | 20.5 | 20.1 | 19.7 | 19.3 | 19.0 | 18.7 | 18.3 | 18.0 | 17.8 | 17.5 | 17.3 | 17.0 | 16.8 | 16.7 | 16.5 | 16.3 | 16.2 |
| 18.3 | 21.8 | 21.4 | 21.0 | 20.6 | 20.2 | 19.8 | 19.4 | 19.1 | 18.8 | 18.5 | 18.2 | 17.9 | 17.7 | 17.5 | 17.2 | 17.0 | 16.9 | 16.7 | 16.6 |
| 18.9 | 22.4 | 21.9 | 21.5 | 21.1 | 20.7 | 20.3 | 19.9 | 19.6 | 19.2 | 18.9 | 18.6 | 18.4 | 18.1 | 17.9 | 17.6 | 17.4 | 17.2 | 17.1 | 16.9 |
| 19.4 | 22.9 | 22.4 | 22.0 | 21.6 | 21.1 | 20.8 | 20.4 | 20.0 | 19.7 | 19.4 | 19.1 | 18.8 | 18.5 | 18.3 | 18.0 | 17.8 | 17.6 | 17.4 | 17.3 |
| 20.0 | 23.4 | 22.9 | 22.5 | 22.1 | 21.6 | 21.2 | 20.9 | 20.5 | 20.1 | 19.8 | 19.5 | 19.2 | 18.9 | 18.7 | 18.4 | 18.2 | 18.0 | 17.8 | 17.6 |
| 20.6 | 23.9 | 23.5 | 23.0 | 22.5 | 22.1 | 21.7 | 21.3 | 20.9 | 20.6 | 20.2 | 19.9 | 19.6 | 19.3 | 19.1 | 18.8 | 18.6 | 18.4 | 18.2 | 18.0 |
| 21.1 | 24.4 | 24.0 | 23.5 | 23.0 | 22.6 | 22.2 | 21.8 | 21.4 | 21.0 | 20.7 | 20.3 | 20.0 | 19.7 | 19.5 | 19.2 | 19.0 | 18.7 | 18.5 | 18.3 |
| 21.7 | 25.0 | 24.5 | 24.0 | 23.5 | 23.1 | 22.7 | 22.2 | 21.8 | 21.5 | 21.1 | 20.8 | 20.5 | 20.1 | 19.9 | 19.6 | 19.3 | 19.1 | 18.9 | 18.7 |
| 22.2 | 25.5 | 25.0 | 24.5 | 24.0 | 23.5 | 23.1 | 22.7 | 22.3 | 21.9 | 21.5 | 21.2 | 20.9 | 20.5 | 20.3 | 20.0 | 19.7 | 19.5 | 19.2 | 19.0 |
| 22.8 | 26.0 | 25.5 | 25.0 | 24.5 | 24.0 | 23.6 | 23.2 | 22.7 | 22.4 | 22.0 | 21.6 | 21.3 | 21.0 | 20.6 | 20.4 | 20.1 | 19.8 | 19.6 | 19.4 |
| 23.3 | 26.5 | 26.0 | 25.5 | 25.0 | 24.5 | 24.1 | 23.6 | 23.2 | 22.8 | 22.4 | 22.0 | 21.7 | 21.4 | 21.0 | 20.7 | 20.5 | 20.2 | 19.9 | 19.7 |
| 23.9 | 27.0 | 26.5 | 26.0 | 25.5 | 25.0 | 24.5 | 24.1 | 23.6 | 23.2 | 22.8 | 22.5 | 22.1 | 21.8 | 21.4 | 21.1 | 20.8 | 20.6 | 20.3 | 20.1 |
| 24.4 | 27.5 | 27.0 | 26.5 | 26.0 | 25.5 | 25.0 | 24.5 | 24.1 | 23.7 | 23.3 | 22.9 | 22.5 | 22.2 | 21.8 | 21.5 | 21.2 | 20.9 | 20.7 | 20.4 |
| 25.0 | 28.0 | 27.5 | 27.0 | 26.5 | 25.9 | 25.4 | 25.0 | 24.5 | 24.1 | 23.7 | 23.3 | 22.9 | 22.6 | 22.2 | 21.9 | 21.6 | 21.3 | 21.0 | 20.8 |
| 25.6 | 28.5 | 28.0 | 27.4 | 26.9 | 26.4 | 25.9 | 25.4 | 25.0 | 24.5 | 24.1 | 23.7 | 23.3 | 23.0 | 22.6 | 22.3 | 21.9 | 21.6 | 21.4 | 21.1 |
| 26.1 | 29.1 | 28.5 | 27.9 | 27.4 | 26.9 | 26.4 | 25.9 | 25.4 | 25.0 | 24.5 | 24.1 | 23.7 | 23.3 | 23.0 | 22.6 | 22.3 | 22.0 | 21.7 | 21.4 |
| 26.7 | 29.6 | 29.0 | 28.4 | 27.9 | 27.3 | 26.8 | 26.3 | 25.9 | 25.4 | 25.0 | 24.5 | 24.1 | 23.7 | 23.4 | 23.0 | 22.7 | 22.4 | 22.1 | 21.8 |
| 27.2 | 30.1 | 29.5 | 28.9 | 28.3 | 27.8 | 27.3 | 26.8 | 26.3 | 25.8 | 25.4 | 24.9 | 24.5 | 24.1 | 23.8 | 23.4 | 23.0 | 22.7 | 22.4 | 22.1 |
| 27.8 | 30.6 | 30.0 | 29.4 | 28.8 | 28.3 | 27.7 | 27.2 | 26.7 | 26.3 | 25.8 | 25.4 | 24.9 | 24.5 | 24.1 | 23.8 | 23.4 | 23.1 | 22.7 | 22.4 |
| 28.3 | 31.1 | 30.5 | 29.9 | 29.3 | 28.7 | 28.2 | 27.7 | 27.2 | 26.7 | 26.2 | 25.8 | 25.3 | 24.9 | 24.5 | 24.1 | 23.8 | 23.4 | 23.1 | 22.8 |
| 28.9 | 31.6 | 30.9 | 30.3 | 29.8 | 29.2 | 28.7 | 28.1 | 27.6 | 27.1 | 26.6 | 26.2 | 25.7 | 25.3 | 24.9 | 24.5 | 24.1 | 23.8 | 23.4 | 23.1 |
| 29.4 | 32.1 | 31.4 | 30.8 | 30.2 | 29.7 | 29.1 | 28.6 | 28.0 | 27.5 | 27.0 | 26.6 | 26.1 | 25.7 | 25.3 | 24.9 | 24.5 | 24.1 | 23.8 | 23.4 |
| 30.0 | 32.6 | 31.9 | 31.3 | 30.7 | 30.1 | 29.6 | 29.0 | 28.5 | 28.0 | 27.5 | 27.0 | 26.5 | 26.1 | 25.6 | 25.2 | 24.8 | 24.5 | 24.1 | 23.8 |
| 30.6 | 33.1 | 32.4 | 31.8 | 31.2 | 30.6 | 30.0 | 29.4 | 28.9 | 28.4 | 27.9 | 27.4 | 26.9 | 26.5 | 26.0 | 25.6 | 25.2 | 24.8 | 24.5 | 24.1 |
| 31.1 | 33.6 | 32.9 | 32.3 | 31.6 | 31.0 | 30.4 | 29.9 | 29.3 | 28.8 | 28.3 | 27.8 | 27.3 | 26.8 | 26.4 | 26.0 | 25.6 | 25.2 | 24.8 | 24.4 |
| 31.7 | 34.0 | 33.3 | 32.7 | 32.1 | 31.5 | 30.9 | 30.3 | 29.8 | 29.2 | 28.7 | 28.2 | 27.7 | 27.2 | 26.8 | 26.3 | 25.9 | 25.5 | 25.1 | 24.8 |
| 32.2 | 34.5 | 33.9 | 33.2 | 32.6 | 31.9 | 31.3 | 30.8 | 30.2 | 29.6 | 29.1 | 28.6 | 28.1 | 27.6 | 27.1 | 26.7 | 26.3 | 25.9 | 25.5 | 25.1 |

FIG. 3B   DRY BULB TEMPERATURE IN FAHRENHEIT

| | 10% | 15% | 20% | 25% | 30% | 35% | 40% | 45% | 50% | 55% | 60% | 65% | 70% | 75% | 80% | 85% | 90% | 95% | 100% |
|---|---|---|---|---|---|---|---|---|---|---|---|---|---|---|---|---|---|---|---|
| 60.0 | 66.6 | 65.8 | 65.2 | 64.5 | 63.9 | 63.3 | 62.8 | 62.2 | 61.7 | 61.3 | 60.8 | 60.4 | 60.1 | 59.7 | 59.4 | 59.2 | 58.9 | 58.7 | 58.5 |
| 61.0 | 67.5 | 66.6 | 66.1 | 65.4 | 64.8 | 64.2 | 63.6 | 63.1 | 62.6 | 62.1 | 61.6 | 61.2 | 60.8 | 60.5 | 60.2 | 59.9 | 59.6 | 59.4 | 59.2 |
| 62.0 | 68.5 | 67.7 | 67.0 | 66.3 | 65.7 | 65.1 | 64.5 | 63.9 | 63.4 | 62.9 | 62.4 | 62.0 | 61.6 | 61.2 | 60.9 | 60.6 | 60.3 | 60.1 | 59.8 |
| 63.0 | 69.4 | 68.7 | 67.9 | 67.2 | 66.6 | 65.9 | 65.3 | 64.7 | 64.2 | 63.7 | 63.2 | 62.8 | 62.3 | 62.0 | 61.6 | 61.3 | 61.0 | 60.7 | 60.5 |
| 64.0 | 70.4 | 69.6 | 68.8 | 68.1 | 67.4 | 66.8 | 66.2 | 65.6 | 65.0 | 64.5 | 64.0 | 63.5 | 63.1 | 62.7 | 62.3 | 62.0 | 61.7 | 61.4 | 61.1 |
| 65.0 | 71.3 | 70.5 | 69.8 | 69.0 | 68.3 | 67.6 | 67.0 | 66.4 | 65.8 | 65.3 | 64.8 | 64.3 | 63.8 | 63.4 | 63.0 | 62.7 | 62.3 | 62.1 | 61.8 |
| 66.0 | 72.3 | 71.4 | 70.7 | 69.9 | 69.2 | 68.5 | 67.9 | 67.2 | 66.6 | 66.1 | 65.5 | 65.0 | 64.6 | 64.1 | 63.7 | 63.4 | 63.0 | 62.7 | 62.4 |
| 67.0 | 73.2 | 72.4 | 71.6 | 70.8 | 70.1 | 69.4 | 68.7 | 68.1 | 67.4 | 66.9 | 66.3 | 65.8 | 65.3 | 64.9 | 64.4 | 64.1 | 63.7 | 63.4 | 63.1 |
| 68.0 | 74.1 | 73.3 | 72.5 | 71.7 | 70.9 | 70.2 | 69.5 | 68.9 | 68.2 | 67.7 | 67.1 | 66.6 | 66.1 | 65.6 | 65.2 | 64.7 | 64.4 | 64.0 | 63.7 |
| 69.0 | 75.1 | 74.2 | 73.4 | 72.6 | 71.8 | 71.1 | 70.4 | 69.7 | 69.1 | 68.4 | 67.9 | 67.3 | 66.8 | 66.3 | 65.9 | 65.4 | 65.0 | 64.7 | 64.4 |
| 70.0 | 76.0 | 75.1 | 74.3 | 73.5 | 72.7 | 71.9 | 71.2 | 70.5 | 69.9 | 69.2 | 68.6 | 68.1 | 67.5 | 67.0 | 66.6 | 66.1 | 65.7 | 65.3 | 65.0 |
| 71.0 | 76.9 | 76.0 | 75.2 | 74.3 | 73.5 | 72.8 | 72.0 | 71.3 | 70.7 | 70.0 | 69.4 | 68.8 | 68.3 | 67.7 | 67.3 | 66.8 | 66.4 | 66.0 | 65.6 |
| 72.0 | 77.9 | 77.0 | 76.1 | 75.2 | 74.4 | 73.6 | 72.9 | 72.1 | 71.4 | 70.8 | 70.2 | 69.6 | 69.0 | 68.5 | 67.9 | 67.5 | 67.0 | 66.6 | 66.2 |
| 73.0 | 78.8 | 77.9 | 77.0 | 76.1 | 75.2 | 74.5 | 73.7 | 72.9 | 72.2 | 71.6 | 70.9 | 70.3 | 69.7 | 69.2 | 68.6 | 68.2 | 67.7 | 67.3 | 66.9 |
| 74.0 | 79.7 | 78.8 | 77.9 | 77.0 | 76.1 | 75.3 | 74.5 | 73.8 | 73.0 | 72.3 | 71.7 | 71.0 | 70.4 | 69.9 | 69.3 | 68.8 | 68.4 | 67.9 | 67.5 |
| 75.0 | 80.6 | 79.7 | 78.7 | 77.8 | 77.0 | 76.1 | 75.3 | 74.6 | 73.8 | 73.1 | 72.4 | 71.8 | 71.2 | 70.6 | 70.0 | 69.5 | 69.0 | 68.5 | 68.1 |
| 76.0 | 81.6 | 80.6 | 79.6 | 78.7 | 77.8 | 77.0 | 76.1 | 75.4 | 74.6 | 73.9 | 73.2 | 72.5 | 71.9 | 71.3 | 70.7 | 70.2 | 69.7 | 69.2 | 68.7 |
| 77.0 | 82.5 | 81.5 | 80.5 | 79.6 | 78.7 | 77.8 | 77.0 | 76.2 | 75.4 | 74.6 | 73.9 | 73.2 | 72.6 | 72.0 | 71.4 | 70.8 | 70.3 | 69.8 | 69.4 |
| 78.0 | 83.4 | 82.4 | 81.4 | 80.4 | 79.5 | 78.6 | 77.8 | 77.0 | 76.2 | 75.4 | 74.7 | 74.0 | 73.3 | 72.7 | 72.1 | 71.5 | 71.0 | 70.4 | 70.0 |
| 79.0 | 84.3 | 83.3 | 82.3 | 81.3 | 80.4 | 79.5 | 78.6 | 77.8 | 76.9 | 76.2 | 75.4 | 74.7 | 74.0 | 73.4 | 72.7 | 72.2 | 71.6 | 71.1 | 70.6 |
| 80.0 | 85.2 | 84.2 | 83.1 | 82.2 | 81.2 | 80.3 | 79.4 | 78.5 | 77.7 | 76.9 | 76.2 | 75.4 | 74.7 | 74.1 | 73.4 | 72.8 | 72.2 | 71.7 | 71.2 |
| 81.0 | 86.1 | 85.1 | 84.0 | 83.0 | 82.1 | 81.1 | 80.2 | 79.3 | 78.5 | 77.7 | 76.9 | 76.2 | 75.4 | 74.8 | 74.1 | 73.5 | 72.9 | 72.3 | 71.8 |
| 82.0 | 87.0 | 85.9 | 84.9 | 83.9 | 82.9 | 81.9 | 81.0 | 80.1 | 79.3 | 78.4 | 77.6 | 76.9 | 76.1 | 75.4 | 74.8 | 74.1 | 73.5 | 72.9 | 72.4 |
| 83.0 | 87.9 | 86.8 | 85.8 | 84.7 | 83.7 | 82.8 | 81.8 | 80.9 | 80.1 | 79.2 | 78.4 | 77.6 | 76.8 | 76.1 | 75.4 | 74.8 | 74.2 | 73.6 | 73.0 |
| 84.0 | 88.8 | 87.7 | 86.6 | 85.6 | 84.6 | 83.6 | 82.6 | 81.7 | 80.8 | 79.9 | 79.1 | 78.3 | 77.5 | 76.8 | 76.1 | 75.4 | 74.8 | 74.2 | 73.6 |
| 85.0 | 89.7 | 88.6 | 87.5 | 86.4 | 85.4 | 84.4 | 83.4 | 82.5 | 81.6 | 80.7 | 79.8 | 79.0 | 78.2 | 77.5 | 76.8 | 76.1 | 75.4 | 74.8 | 74.2 |
| 86.0 | 90.6 | 89.5 | 88.4 | 87.3 | 86.2 | 85.2 | 84.2 | 83.2 | 82.3 | 81.4 | 80.6 | 79.7 | 78.9 | 78.2 | 77.4 | 76.7 | 76.0 | 75.4 | 74.8 |
| 87.0 | 91.5 | 90.3 | 89.2 | 88.1 | 87.0 | 86.0 | 85.0 | 84.0 | 83.1 | 82.2 | 81.3 | 80.4 | 79.6 | 78.8 | 78.1 | 77.4 | 76.7 | 76.0 | 75.4 |
| 88.0 | 92.4 | 91.2 | 90.1 | 88.9 | 87.9 | 86.8 | 85.8 | 84.8 | 83.8 | 82.9 | 82.0 | 81.1 | 80.3 | 79.5 | 78.7 | 78.0 | 77.3 | 76.6 | 76.0 |
| 89.0 | 93.3 | 92.1 | 90.9 | 89.8 | 88.7 | 87.6 | 86.6 | 85.6 | 84.6 | 83.6 | 82.7 | 81.9 | 81.0 | 80.2 | 79.4 | 78.6 | 77.9 | 77.2 | 76.6 |
| 90.0 | 94.2 | 93.0 | 91.8 | 90.6 | 89.5 | 88.4 | 87.4 | 86.3 | 85.3 | 84.4 | 83.5 | 82.6 | 81.7 | 80.8 | 80.0 | 79.3 | 78.5 | 77.8 | 77.1 |

AUTOMATIC SWITCHOVER THERMOSTAT SYSTEM BASED ON APPARENT TEMPERATURE AND METHOD FOR DETERMINING AND AUTOMATICALLY CONTROLLING THE APPARENT TEMPERATURE OF A CONDITIONED SPACE

CROSS-REFERENCE TO RELATED APPLICATION(S)

The present application claims priority to and the benefit of U.S. Provisional Patent Application No. 62/570,835, filed Oct. 11, 2017 with the U.S. Patent and Trademark Office, the entire contents of which are incorporated herein by reference.

FIELD

The present disclosure relates generally to climate control units and methods of controlling the climate of an interior space.

BACKGROUND

Heating, ventilation, and air-conditioning (HVAC) systems are commonly used to regulate the temperature of an interior space, such as a room in a residential or commercial building or industrial building, etc. In general, HVAC systems are configured to maintain the temperature set on a thermostat. However, conventional HVAC systems are not configured to account for other factors that affect the comfort level of occupants in the space, such as relative humidity, radiative heat transfer from other individuals in the space, and equipment operating in the space. For instance, a variety of factors may change the relative humidity inside the space, such as a change in outside temperature or weather conditions, a change in room occupancy, and a change in the heat generated inside the space, and a HVAC system with a conventional thermostat will continue to maintain the set temperature without regard for the change in relative humidity, which can cause the space to become uncomfortable for the occupants.

More complex HVAC systems are configured to adjust both the temperature and the relative humidity of the interior space. However, these more complex HVAC systems typically include a humidifier, a dehumidifier, and a reheat system, which are expensive.

SUMMARY

The present disclosure is directed to various embodiments of a climate control system configured to control a heating unit and a cooling unit. In one embodiment, the climate control system includes a temperature sensor configured to measure a current dry bulb temperature, a humidity sensor configured to measure a current relative humidity, a processor, and a non-transitory computer-readable storage medium operably coupled to the processor. The non-transitory computer-readable storage medium having software instructions stored therein, which, when executed by the processor, cause the processor to determine a current apparent temperature based on at least the current dry bulb temperature measured by the temperature sensor and the current relative humidity measured by the humidity sensor, receive a user-selected desired apparent temperature, activate the heating unit in a heating mode when the current apparent temperature is below a lower apparent temperature threshold based on the user-selected desired apparent temperature, and activate the cooling unit in a cooling mode when the current apparent temperature is above an upper apparent temperature threshold based on the user-selected desired apparent temperature. The software instructions, when executed by the processor, cause the processor to automatically switch between the heating mode and the cooling mode.

The software instructions may include a lookup table, and the software instructions, when executed by the processor, may cause the processor to determine the current apparent temperature from the lookup table.

The software instructions may include a semi-empirical algebraic equation defining the current apparent temperature, and the software instructions, when executed by the processor, may cause the processor to calculate the current apparent temperature from the semi-empirical algebraic equation.

The semi-empirical algebraic equation may be $$AT = T_a + 0.33 * \rho - 0.70 * ws - 4.00,$$

wherein $$\rho = rh * 6.105 * e^{\left(17.27 * \frac{T_a}{237.7 + T_a}\right)},$$

where AT is the apparent temperature in ° C.; Ta is the dry bulb temperature in ° C.; $\rho$ is the water vapor pressure (hPa); ws is the wind speed; and rh is the relative humidity (%).

The software instructions, when executed by the processor, may further cause the processor to calculate a target dry bulb temperature corresponding to the user-selected desired apparent temperature and the current relative humidity.

The software instructions may include a polynomial equation, and the software instructions, when executed by the processor, may cause the processor to calculate the target dry bulb temperature from the polynomial equation.

The polynomial equation may be $-0.002227 \times AT^2 + 1.06 \times AT + 3.4902 \times RH^2 - 3.6014 \times RH - 0.33346 \times AT \times RH + 4.0937$, where AT is the user-selected desired apparent temperature and RH is the current relative humidity.

The software instructions, when executed by the processor, may further cause the processor to calculate a target relative humidity corresponding to the user-selected desired apparent temperature and the current dry bulb temperature.

The system may further include an input unit configured to input the user-selected desired apparent temperature.

The input unit may be configured to cause the processor to calculate the current apparent temperature and cause the processor to set the lower apparent temperature threshold equal to the current apparent temperature when the system is operating in the heating mode and to set the upper apparent temperature threshold equal to the current apparent temperature when the system is operating in the cooling mode.

The system may include a display configured to display at least one of the current dry bulb temperature, the current relative humidity, the current apparent temperature, and the user-selected desired apparent temperature.

The non-transitory computer-readable storage medium may be configured to store a first user-selected desired apparent temperature associated with a first user, and store a second user-selected desired apparent temperature associated with a second user.

The present disclosure is also directed to various methods of controlling the climate of a conditioned space. In one embodiment, the method includes determining a current dry bulb temperature of the conditioned space, determining a current relative humidity of the conditioned space, calculating or determining a current apparent temperature of the conditioned space based on at least the current relative humidity and the current dry bulb temperature of the conditioned space, activating a heating unit in a heating mode when the current apparent temperature is below a lower apparent temperature threshold based on a user-selected desired apparent temperature, activating a cooling unit in a cooling mode when the current apparent temperature is above an upper apparent temperature threshold based on the user-selected desired apparent temperature, and automatically switching between the heating mode and the cooling mode.

Determining the current dry bulb temperature may include measuring the current dry bulb temperature with a temperature sensor, and determining the current relative humidity may include measuring the current relative humidity with a humidity sensor.

The method may also include receiving the user-selected desired apparent temperature of the conditioned space.

The method may include determining a difference between the user-selected desired apparent temperature and the current apparent temperature of the conditioned space.

The method may include determining a target dry bulb temperature corresponding to the user-selected desired apparent temperature and the current relative humidity in the conditioned space.

Determining the target dry bulb temperature may include calculating the target dry bulb temperature from a polynomial equation. The polynomial equation may be $0.002227*AT^2+1.06*AT+3.4902*RH^2-3.6014*RH-0.33346*AT*RH+4.0937$, where AT is the user-selected desired apparent temperature and RH is the current relative humidity.

The method may include determining a target relative humidity corresponding to the user-selected desired apparent temperature and the current dry bulb temperature in the conditioned space.

Calculating or determining the current apparent temperature may include determining the current apparent temperature from a lookup table.

Calculating or determining the apparent temperature my include calculating the current apparent temperature with a semi-empirical algebraic equation.

The semi-empirical algebraic equation may be $$AT = T_a + 0.33*\rho - 0.70*ws - 4.00,$$

wherein $$\rho = rh*6.105*e^{\left(17.27*\frac{T_a}{237.7+T_a}\right)},$$

where AT is the apparent temperature in ° C.; Ta is the dry bulb temperature in ° C.; ρ is the water vapor pressure (hPa); ws is the wind speed; and rh is the relative humidity (%).

Calculating or determining the current apparent temperature may be based on one or more additional factors, such as radiated heat loads, outside temperature, a season, activity level, clothing, radiation, wind speed, etc.

The present disclosure is also directed to various embodiments of a non-transitory computer-readable storage medium. In one embodiment, the non-transitory computer-readable storage medium has software instructions stored therein, which, when executed by a processor, cause the processor to determine a current dry bulb temperature, determine a current relative humidity, determine a current apparent temperature based on the current dry bulb temperature and the current relative humidity, receive a user-selected desired apparent temperature, activate a heating unit in a heating mode when the current apparent temperature is below a lower apparent temperature threshold based on the user-selected desired apparent temperature, activate a cooling unit in a cooling mode when the current apparent temperature is above an upper apparent temperature threshold based on the user-selected desired apparent temperature, and automatically switch between the heating mode and the cooling mode.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 2A and 2B are tables depicting the apparent temperature in degrees Celsius and degrees Fahrenheit, respectively, as a function of dry bulb temperature and relative humidity according to one embodiment of the present disclosure;

FIGS. 3A and 3B are tables depicting the dry bulb temperature in degrees Celsius and degrees Fahrenheit, respectively, as a function of apparent temperature and relative humidity according to one embodiment of the present disclosure;

DETAILED DESCRIPTION

The present disclosure is directed to various embodiments of systems and methods configured to control and maintain the comfort level of one or more occupants in a controlled or conditioned space, such as the interior space of a residential building or a commercial building or industrial building, etc., by maintaining the apparent temperature in the controlled space, which is a function of both the dry bulb temperature and the relative humidity in the controlled space. Additionally, in various embodiments, the systems and methods of the present disclosure are configured to provide energy cost savings when operated under certain conditions compared to conventional thermostats that measure only the dry bulb temperature of the space.

Figure 1A:
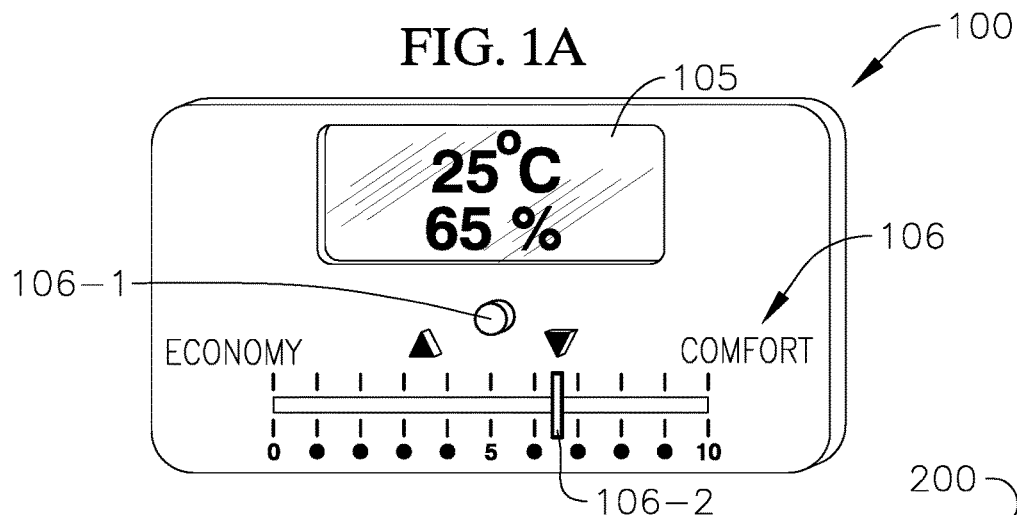
FIGS. 1A-1B are a schematic view and a block diagram view, respectively, of a thermostat system connected to control an air-conditioning unit of a heating, venting, and air-conditioning (HVAC) system according to one embodiment of the present disclosure.
Figure 1B:
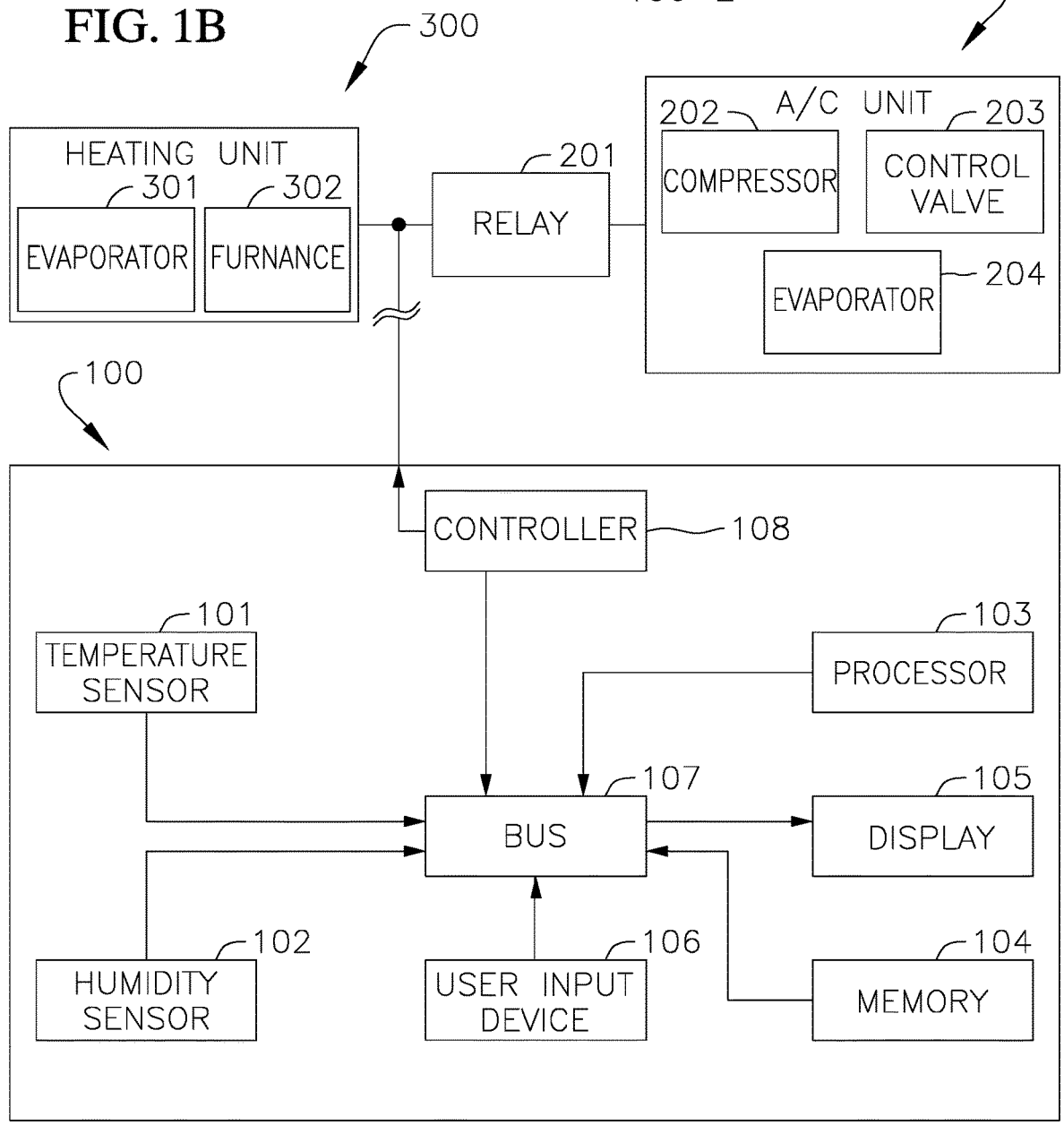

With reference now to FIGS. 1A-1B, a climate control system 100 according to one embodiment of the present disclosure includes a temperature sensor 101 configured to measure a dry bulb temperature of a controlled space (e.g., an interior space of a residential or commercial building or industrial building, etc.), a humidity sensor 102 (e.g., a hygrometer) configured to measure a relative humidity of the controlled spaced, a processor 103, a memory 104 (i.e., a non-transitory computer-readable storage medium), a display 105 for displaying images, and user input device 106 configured to enable a user to select a desired apparent temperature of the controlled space. As used herein, the term "dry bulb temperature" refers to the temperature of air measured by a thermometer freely exposed to the air, but shielded from radiation and moisture. Additionally, in the illustrated embodiment, the system 100 includes a system bus 107 over which the temperature sensor 101, the humidity sensor 102, the processor 103, the memory 104, the display 105, and the user input device 106 communicate with each other.

The term "processor" is used herein to include any combination of hardware, firmware, and software, employed to process data or digital signals. The hardware of a processor may include, for example, application specific integrated circuits (ASICs), general purpose or special purpose central processors (CPUs), digital signal processors (DSPs), graphics processors (GPUs), and programmable logic devices such as field programmable gate arrays (FPGAs). In a processor, as used herein, each function is performed either by hardware configured, i.e., hard-wired, to perform that function, or by more general purpose hardware, such as a CPU, configured to execute instructions stored in a non-transitory storage medium. A processor may be fabricated on a single printed wiring board (PWB) or distributed over several interconnected PWBs. A processor may contain other processors; for example a processor may include two processors, an FPGA and a CPU, interconnected on a PWB.

The input device 106 may be any suitable device that enables a user to enter the desired apparent temperature of the controlled space, which is a function of both dry bulb temperature and relative humidity, rather than the desired dry bulb temperature of space as in conventional thermostats. As used herein, the term "user" refers to a user of a single-user system, a dual-user system, or a multi-user system. In one or more embodiments, the input device 106 may include one or more physical controls on a housing of the system (e.g., one or more push buttons, a slider, and/or one or more knobs). In one or more embodiments, the input device 106 may be a graphic displayed on the display 105 that may be selected by touching the display 105 (e.g., the display 105 may be a touch screen). In one or more embodiments, the input device 106 may be a wired or wireless device, such as a remote control. In one or more embodiments, the input device 106 may include a network adapter configured to communicate wirelessly with a mobile device, such as a cellular device (e.g., a smartphone) or a device configured to communicate wirelessly over short distances (e.g., a Bluetooth® device). Additionally, in one or more embodiments, the input device 106 is configured to enable a user to select the current apparent temperature of the controlled space as the desired apparent temperature without specifying a particular desired apparent temperature. For instance, in one or more embodiments, the input device 106 may include a button 106-1 which, when depressed by a user, cause the processor 103 to determine or calculate the current apparent temperature from the current dry bulb temperature measured by the temperature sensor 101 and the current relative humidity measured by the humidity sensor 102, and cause the processor 103 to store this current apparent temperature as the user-selected desired apparent temperature in the memory 104. In one or more embodiments, the button 106-1, when depressed by a user, may cause the processor 103 determine or calculate the current apparent temperature in the conditioned space and to set either an upper apparent temperature limit or threshold or a lower apparent temperature limit of or threshold of a dead band equal or substantially equal to the current apparent temperature depending on whether the system 100 is operating in a cooling mode or a heating mode. For example, in one or more embodiments, when the system 100 is operating in cooling mode and the button 106-1 is pressed, the system 100 may shift the upper and lower apparent temperature limits (as shown, e.g., in FIG. 6) such that the upper apparent temperature threshold of the dead band is equal or substantially equal to the current apparent temperature determined or calculated when the button 106-1 is pressed. Additionally, in one or more embodiments, when the system 100 is operating in heating mode and the button 106-1 is pressed, the system 100 may shift the upper and lower apparent temperature limits (as shown, e.g., in FIG. 6) such that the lower apparent temperature threshold of the dead band is equal or substantially equal to the current apparent temperature determined or calculated when the button 106-1 is pressed. In one or more embodiments, the input device 106 may include a slider 106-2 configured to allow a user to indirectly select the desired apparent temperature. For instance, in one or more embodiments, the slider 106-2 enables a user to select a balance between comfort (e.g., in which the system 100 is configured to strictly maintain the desired apparent temperature) and economy (e.g., in which the system 100 is configured to activate the heating and/or cooling unit only when the actual apparent temperature is outside of threshold limits (e.g., a dead band) above and below the desired apparent temperature. In one or more embodiments, the size of the dead band (e.g., the amount that the threshold limits are above and below the desired apparent temperature) increases as the slider 106-2 is moved toward the "Economy" setting and decreases as the slider 106-2 is moved toward the "Comfort" setting (e.g., the slider 106-2 is configured to widen and narrow the dead band). For example, in one or more embodiments, the user may input a desired apparent temperature of 75° F. (e.g., by pressing an icon on the display 105, engaging one or more physical controls, such as the button 106-1, and/or by utilizing a remote device, such as a cellular phone) and then the user may adjust the slider 106-2 to the desired position along the spectrum between the "Comfort" setting, in which the system 100 would calculate a narrow dead band (e.g., +/−0.5° F.) or no dead band about the desired apparent temperature of 75° F., and the "Economy" setting, in which the system 100 would calculate a maximum width dead band (e.g., +/−6.0° F.) about the desired apparent temperature of 75° F.

In one or more embodiments, the memory 104 may include persistent memory, such as NAND flash memory, for storing user settings entered via the one or more input devices 106. For instance, in one or more embodiments, the memory 104 may be configured to store the individual preferred temperature settings of two or more individual users which may be recalled for later use (e.g., "user 1": 75° F. apparent temperature; "user 2": 77° F. apparent temperature; "user 3": 68° F. apparent temperature). Accordingly, in one or more embodiments, a user may select, through the input device 106, a profile identifying that individual user (e.g., "user 1") such that the instructions stored in the memory 104, when executed by the processor 103, cause the processor 103 to control an air-conditioning unit until the apparent temperature of the controlled space is equal to or substantially equal to the desired apparent temperature (e.g., 75° F.) associated with that user.

The memory 104 of the system 100 stores instructions that, when executed by the processor 103, cause the processor 103 to calculate an apparent temperature in the controlled space based on the dry bulb temperature measured by the temperature sensor 101 and the relative humidity measured by the humidity sensor 102. In one or more embodiments, the temperature sensor 101 and the humidity sensor 102 may continuously measure the dry bulb temperature and the relative humidity, respectively, of the conditioned space. In one or more embodiments, the temperature sensor 101 and the humidity sensor 102 may measure the dry bulb temperature and the relative humidity, respectively, of the conditioned spaced at discrete times (e.g., regular intervals). Additionally, in one or more embodiments, the instructions stored in the memory 104, when executed by the processor 103, cause the processor 103 to calculate or determine an average of the dry bulb temperature and an average of the relative humidity over a predefined time period (e.g., a time period in a range from approximately 1 minute to approximately 15 minutes or more), and to calculate the apparent temperature of the conditioned-spaced based on the average dry bulb temperature and the average relative humidity over the predefined time period.

In one or more embodiments, the instructions stored in the memory 104 include a lookup table that lists the apparent temperature that corresponds to a given dry bulb temperature and a given relative humidity. FIGS. 2A-2B are lookups tables showing the apparent temperature as a function of dry bulb temperature and relative humidity according to one embodiment of the present disclosure. Accordingly, in one or more embodiments, the instructions stored in the memory 104, when executed by the processor 103, cause the processor 103 to reference a lookup table (e.g., one of the lookup tables in FIGS. 2A-2B) to determine the apparent temperature associated with the dry bulb temperature measured by the temperature sensor 101 (or an average dry bulb temperature measured over a predefined time period) and the relative humidity measured by the humidity sensor 102 (or an average relative humidity measured by the humidity sensor). For instance, in one or more embodiments, if the dry bulb temperature is 20.0° C. (68.0° F.) (as measured by the temperature sensor 101 or calculated as an average or two or more temperature measurements over a predefined time period) and the relative humidity is 30% (as measured by the humidity sensor 102 or calculated as an average or two or more relative humidity measurements over a predefined time period), the instructions stored in the memory 104, when executed by the processor 103, would cause the processor 103 to reference the lookup tables in FIGS. 2A-2B and determine that the corresponding apparent temperature is 18.1° C. (64.6° F.).

In one or more embodiments, the instructions stored in the memory 104 include one or more semi-empirical algebraic equations defining the apparent temperature as a function of the dry bulb temperature (as measured by the temperature sensor 101 or calculated as an average or two or more temperature measurements over a predefined time period) and the relative humidity (as measured by the humidity sensor 102 or calculated as an average or two or more relative humidity measurements over a predefined time period). In one embodiment, the semi-empirical algebraic equations are the following equations developed by R. G. Steadman:

$$AT = T_a + 0.33*\rho - 0.70*ws - 4.00, \quad \text{Equation 1}$$

$$\rho = rh*6.105*e^{\left(17.27*\frac{T_a}{237.7+T_a}\right)} \quad \text{Equation 2}$$

where AT is the Apparent Temperature in ° C.; $T_a$ is the dry bulb temperature in ° C.; $\rho$ is the water vapor pressure (hPa); ws is the wind speed; and rh is the relative humidity (%). Accordingly, in one embodiment, the instructions stored in the memory 104, when executed by the processor 103, cause the processor 103 to calculate the vapor water pressure p according to Equation 2 above based on the dry bulb temperature (as measured by the temperature sensor 101 or calculated as an average or two or more temperature measurements over a predefined time period) and the relative humidity (rh) (as measured by the humidity sensor 102 or calculated as an average or two or more relative humidity measurements over a predefined time period), and cause the processor 103 to calculate the apparent temperature (AT) according to Equation 1 above based on the dry bulb temperature, the water vapor pressure (p) determined according to Equation 2, and the wind speed (ws). In one or more embodiments, the instructions stored in the memory 104 may include any other suitable empirical or semi-empirical algebraic equation(s) for determining the apparent temperature based on the dry bulb temperature (as measured by the temperature sensor 101 or calculated as an average or two or more temperature measurements over a predefined time period) and the relative humidity (as measured by the humidity sensor 102 or calculated as an average or two or more relative humidity measurements over a predefined time period). For instance, in one or more embodiments, the instructions stored in memory 104 may include any other apparent temperature formula or a combination of formulas or modified formulas developed, for instance, through field-testing. Additionally, in one or more embodiments, the instructions stored in the memory 104 may include either a lookup table (e.g., one of the lookup tables in FIGS. 2A-2B) or one or more semi-empirical algebraic equations (e.g., Equation 1 and Equation 2 above) for determining or calculating the apparent temperature from the dry bulb temperature and the relative humidity. In one or more embodiments, the instructions stored in the memory 104 may be programmed with both a lookup table and one or more semi-empirical algebraic equations for determining the apparent temperature from the dry bulb temperature and the relative humidity.

In one or more embodiments, the instructions stored in the memory 104 may include an algebraic equation(s) or a lookup table for determining the apparent temperature in the controlled spaced that accounts for other factors or variables in addition to the dry bulb temperature and the relative humidity, such as, for instance, air velocity, radiated heat loads in the controlled space (e.g., radiated heat loads from occupants in the controlled space), net radiation absorbed per unit area of body surface, the outside temperature (e.g., the ambient temperature outside of the residential or commercial building or industrial building, etc.), the season (e.g., fall, winter, spring, or summer), the activity level of one or more occupants in the controlled space, the type or kind of clothing worn by one or more occupants in the controlled space, wind speed, etc.

The instructions stored in the memory 104, when executed by the processor 103, also cause the processor 103 to calculate a difference between the apparent temperature in the controlled space and a user-selected apparent temperature (i.e., an apparent temperature desired by a user) input by the input device 106.

With continued reference to the embodiment illustrated in FIG. 1B, the system 100 also includes a controller 108 (e.g., a proportional-integral-derivative (PID) microcontroller) configured to control an air-conditioning unit 200 and/or a heating unit 300 to achieve and maintain the desired apparent temperature in the controlled space. Additionally, in one or more embodiments, the instructions stored in the memory 104, when executed by the processor 103, cause the controller 108 to control the air-conditioning unit 200 and/or the heating unit 300 to increase or decrease the dry bulb temperature in the controlled space until the apparent temperature in the controlled space, as determined based at least in part by the dry bulb temperature (as measured by the temperature sensor 101 or calculated as an average or two or more temperature measurements over a predefined time period) and the relative humidity (as measured by the humidity sensor 102 or calculated as an average or two or more relative humidity measurements over a predefined time period), is equal or substantially equal to the user-selected desired apparent temperature in the controlled space. The controller 108 may be configured to control the air-conditioning unit 200 in any suitable manner. For instance, in one or more embodiments, the controller 108 may be configured to actuate a relay 201 (e.g., open or close a switch) to cause the air-conditioning unit 200 to start and stop to increase or decrease the dry bulb temperature in the controlled space. In one or more embodiments, the controller 108 may be configured to control (e.g., vary) the speed of a compressor 202 in the air-conditioning unit 200 to increase or decrease the dry bulb temperature in the controlled space. Additionally, in one or more embodiments, the controller 108 may be configured to regulate a control valve 203 of the air-conditioning unit 200 to increase or decrease the dry bulb temperature in the controlled space. In one or more embodiments, the controller 108 may be configured to control an evaporator 301 and/or a furnace 302 of the heating unit 300 to increase or decrease the dry bulb temperature in the controlled space. In one or more embodiments, the air-conditioning unit 200 may be an outdoor unit and the heating unit 300 may be an indoor unit. In one or more embodiments, both the air-conditioning unit 200 and the heating unit 300 may be indoor units.

In one embodiment, the instructions stored in the memory 104, when executed by the processor 103, cause the processor 103 to calculate or determine the target dry bulb temperature of the controlled space that corresponds to the desired apparent temperature and the current relative humidity of the controlled space (as measured by the humidity sensor 102 or calculated as an average or two or more relative humidity measurements over a predefined time period). FIGS. 3A-3B are lookup tables listing the target dry bulb temperature that corresponds to a given desired apparent temperature and a given relative humidity according to one embodiment of the present disclosure. In one or more embodiments, the processor 103 may be configured to input the user-selected desired apparent temperature and the current relative humidity of the controlled space into a lookup table (e.g., one of the lookup tables illustrated in FIGS. 3A-3B) to determine the target dry bulb temperature that corresponds to the desired apparent temperature and the current relative humidity in the controlled space. For example, in one or more embodiments, if the desired apparent temperature is 75.0° F. (23.9° C.) and the current relative humidity in the controlled space is 70%, the target dry bulb temperature of the controlled space that corresponds to the desired apparent temperature and the current relative humidity is 71.2° F. (21.8° C.). Once the target dry bulb temperature of the controlled space is determined, the instructions stored in the memory 104, when executed by the processor 104, may cause the controller 108 to control the air-conditioning to increase or decrease the dry bulb temperature in the controlled space until the dry bulb temperature (as measured by the temperature sensor 101 or calculated as an average or two or more temperature measurements over a predefined time period) matches or substantially matches the target dry bulb temperature. For instance, in the above-described example in which the current relative humidity in the controlled space is 70% and the desired apparent temperature is 75.0° F. (23.9° C.), the controller 108 may control the air-conditioning unit until the dry bulb temperature in the conditioned space is 71.2° F. (21.8° C.) or approximately 71.2° F. (21.8° C.).

In one embodiment, the instructions stored in the memory 104 include a polynomial equation defining the target dry bulb temperature of the controlled space that corresponds to the desired apparent temperature and the current relative humidity of the controlled space. In one or more embodiments, the polynomial equation defining the target dry bulb temperature is as follows:

$$-0.002227*AT^2+1.06*AT+3.4902*RH^2-3.6014*RH-0.33346*AT*RH+4.0937 \qquad \text{Equation 3}$$

where AT is the desired apparent temperature and RH is the current relative humidity of the controlled space (as measured by the humidity sensor 102 or calculated as an average or two or more relative humidity measurements over a predefined time period).

Accordingly, in one or more embodiments, the instructions stored in the memory 104, when executed by the processor 103, cause the processor 103 to calculate from an equation (e.g., Equation 3 above) the target dry bulb temperature of the controlled space that corresponds to the desired apparent temperature and the current relative humidity of the controlled space (as measured by the humidity sensor 102 or calculated as an average or two or more relative humidity measurements over a predefined time period). Once the target dry bulb temperature has been calculated, the instructions stored in the memory 104, when executed by the processor 104, may cause the controller 108 to control the air-conditioning to increase or decrease the dry bulb temperature in the controlled space until the dry bulb temperature (as measured by the temperature sensor 101 or calculated as an average or two or more temperature measurements over a predefined time period) matches or substantially matches the target dry bulb temperature.

In one embodiment, the instructions stored in the memory 104, when executed by the processor 103, cause the processor to calculate or determine the target relative humidity of the controlled space that corresponds to the desired apparent temperature and the current dry bulb temperature of the controlled space (as measured by the temperature sensor 101 or calculated as an average or two or more temperature measurements over a predefined time period). In one or more embodiments, the controller 108 may be configured to input the user-selected desired apparent temperature and the current dry bulb temperature of the controlled space into a lookup table (e.g., one of the lookup tables illustrated in FIGS. 3A-3B) to determine the target relative humidity that corresponds to the desired apparent temperature and the current dry bulb temperature in the controlled space. In one or more embodiments, if the desired apparent temperature is 75.0° F. (23.9° C.) and the current dry bulb temperature in the controlled space is 70.0° F. (21.1° C.), the target relative humidity that corresponds to the desired apparent temperature and the current dry bulb temperature is approximately 80%. Once the target relative humidity of the controlled space is determined, the instructions stored in the memory 104, when executed by the processor 103, may cause the controller 108 to control the air-conditioning unit 200 to increase or decrease the relative humidity in the controlled space until the relative humidity measured (as measured by the humidity sensor 102 or calculated as an average or two or more relative humidity measurements over a predefined time period) matches or substantially matches the target relative humidity. For instance, if the current dry bulb temperature in the controlled space is 70.0° F. (21.1° C.) and the desired apparent temperature is 75.0° F. (23.9° C.), the controller 108, according to one or more embodiments, may control the air-conditioning unit 200 until the relative humidity in the conditioned space is 80% or approximately 80%.

In one embodiment, the controller 108 may be configured to lower the refrigerant temperature of the air-conditioning unit 200 to decrease the relative humidity in the space, and configured to increase the refrigerant temperature of the air-conditioning unit 200 to increase the relative humidity in the space (e.g., the controller 108 may be configured to vary the refrigerant temperature of the air-conditioning unit 200 to achieve a desired apparent temperature in the space and to maintain a constant or substantially constant apparent temperature of the space). In one embodiment, the controller 108 may be configured to lower the refrigerant temperature of the air-conditioning unit 200 by decreasing the airflow through an evaporator 204 of the air-conditioning unit 200 and/or reducing the expansion valve capacity (if the air-conditioning unit includes a direct expansion evaporator) or reducing the refrigerant medium temperature (if the air-conditioning unit includes a fan coil). In one embodiment, the controller 108 may be configured to increase the refrigerant temperature of the air-conditioning unit 200 by increasing the airflow through the evaporator 204 of the air-conditioning unit 200 and/or increasing the expansion valve capacity (if the air-conditioning unit includes a direct expansion evaporator) or increasing the refrigerant medium temperature (if the air-conditioning unit includes a fan coil). In one or more embodiments, the signal from the system 100 to the air-conditioning unit 200 may be a PID signal and a cooling or heating mode signal.

Accordingly, the system 100 is configured to achieve and maintain the desired apparent temperature in the conditioned space by controlling the air-conditioning unit 200 to vary the dry bulb temperature and/or the relative humidity in the conditioned space.

In one or more embodiments, the systems and methods of the present disclosure are configured to provide energy cost savings when operated under certain conditions compared to conventional thermostats that measure only the dry bulb temperature of the space. For instance, when the system 100 is operating in heating mode (e.g., the controller 108 is controlling the heating unit 300 to increase the dry bulb temperature of the space) and the desired apparent temperature of the space is higher than or equal to the dry bulb temperature associated with the desired apparent temperature (to the right of and below the bold line in the tables in FIGS. 2A-2B), the system 100 will stop heating the space when the desired apparent temperature is reached, which is below the dry bulb temperature of the space. Accordingly, when the system 100 is operating in heating mode under the temperature and humidity conditions shown to the right of and below the bold line in FIGS. 2A-2B, the system 100 of the present disclosure provides energy cost savings compared to a conventional thermostats that control the heating unit to heat the space until the desired dry bulb temperature is reached. Likewise, when the system 100 is operating in cooling mode (e.g., the controller 108 is controlling the air-conditioning unit 200 to decrease the dry bulb temperature of the space) and the desired apparent temperature of the space is less than dry bulb temperature associated with the desired apparent temperature, the system 100 will stop cooling the space when the desired apparent temperature is reached, which is higher than the dry bulb temperature of the space, which results in energy cost savings compared to conventional thermostats that control the air-conditioning to cool the space until the desired dry bulb temperature is reached.

Figure 4A:
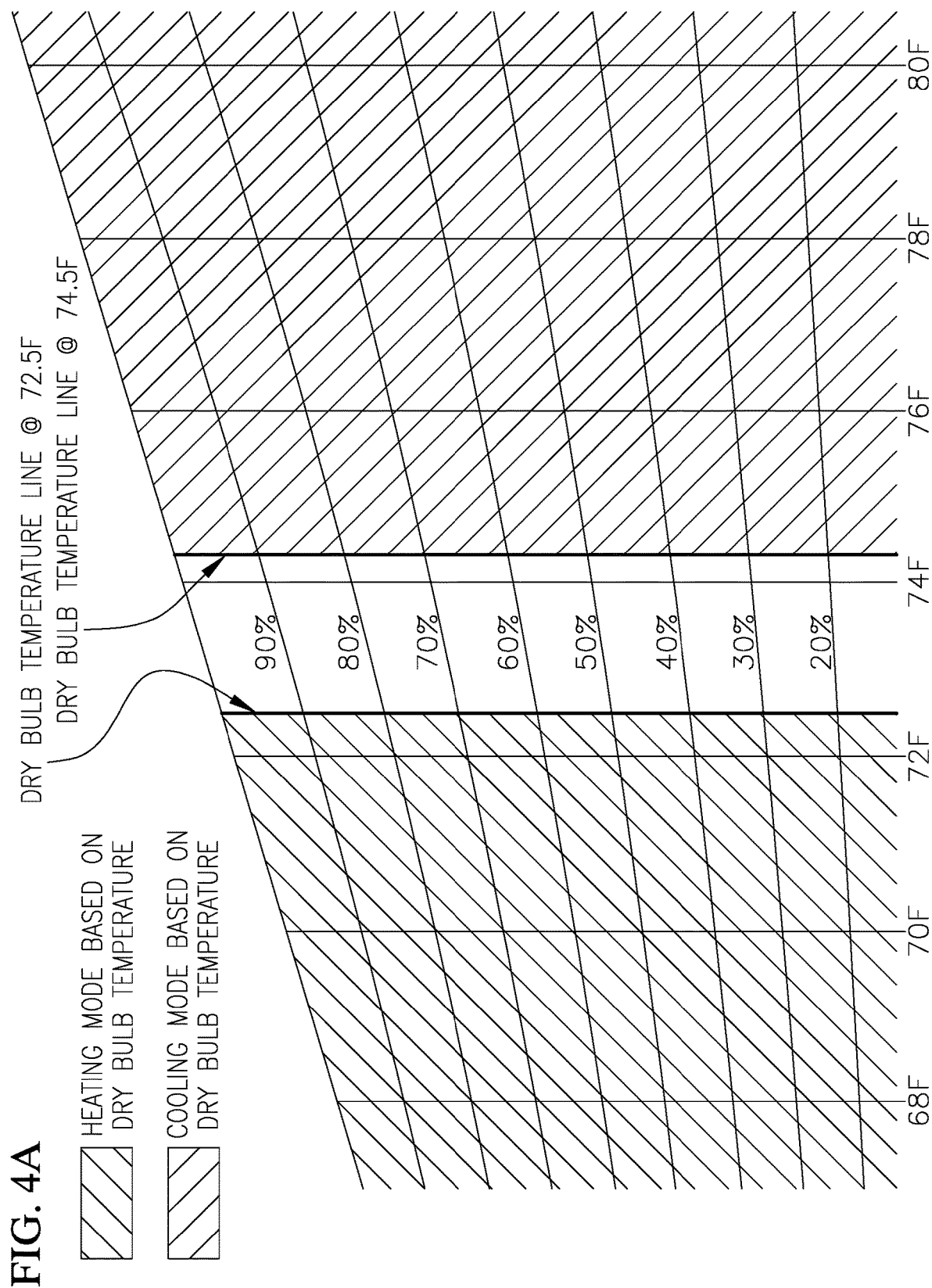
FIGS. 4A-4C are graphs comparing the temperature switchover control methodology for conventional thermostats and the temperature switchover control methodology according to one embodiment of the present disclosure with dead bands.
Figure 4B:
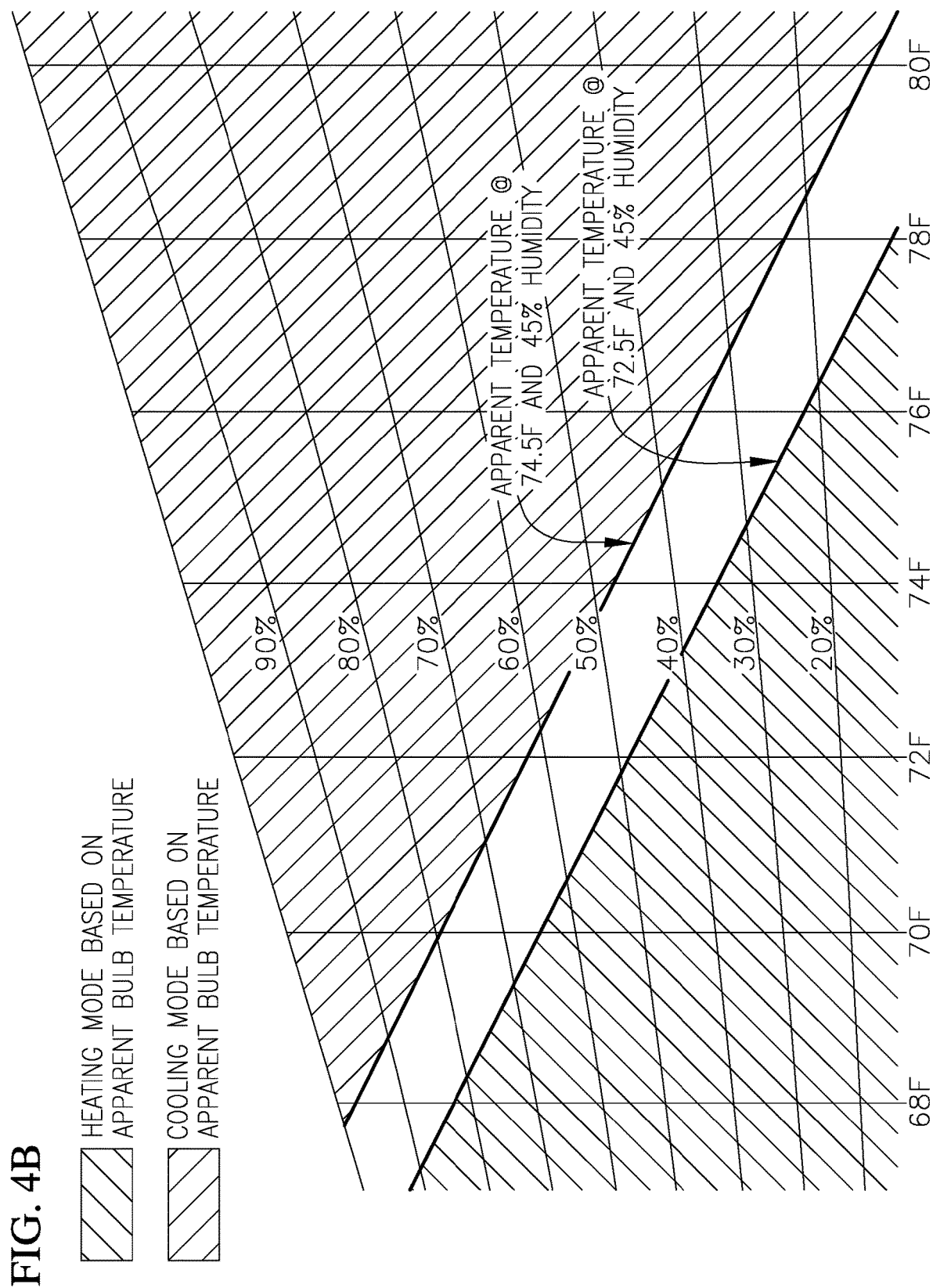
Figure 4C:
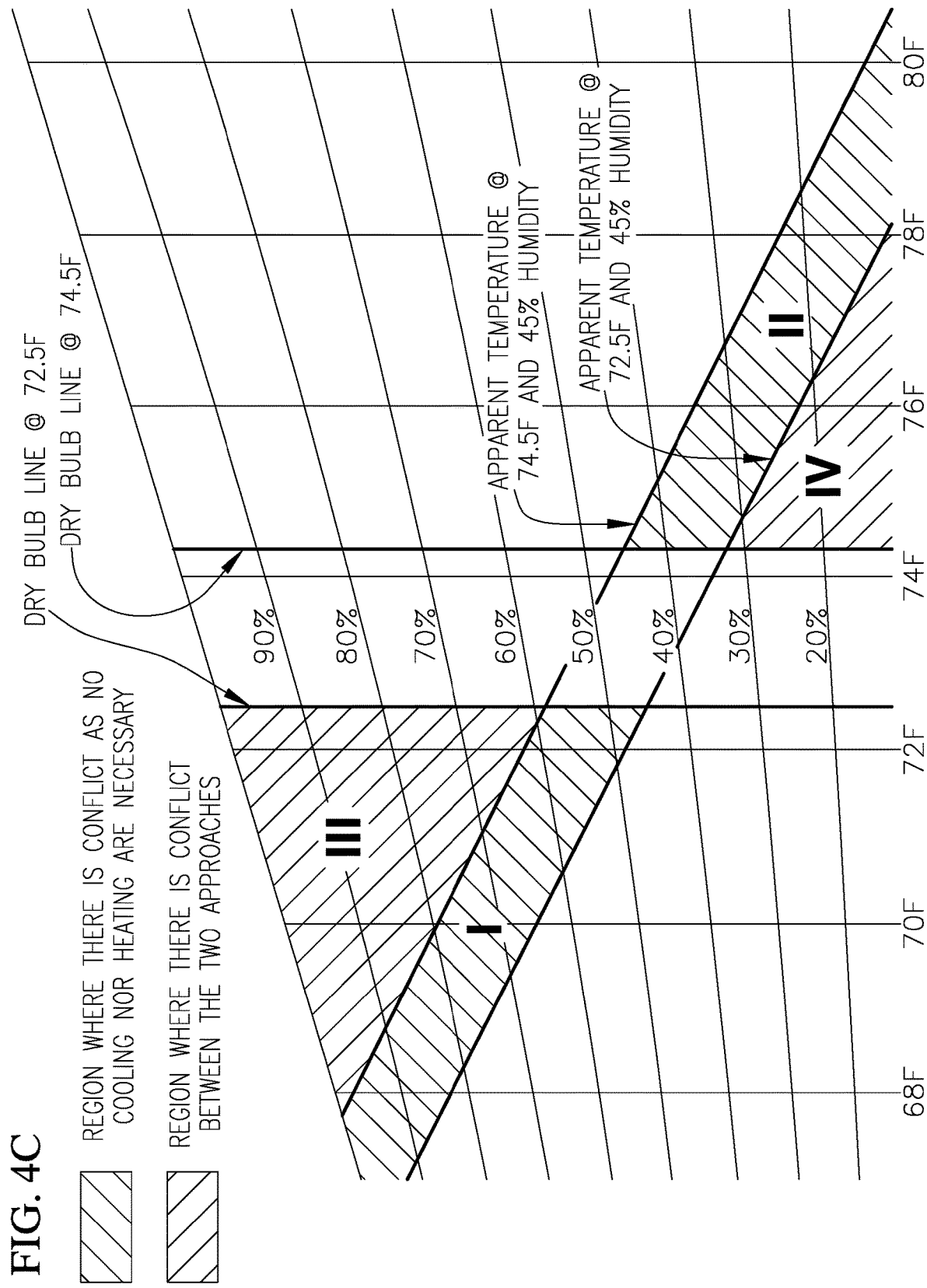

FIGS. 4A-4C compare the automatic switchover between heating and cooling modes of a conventional thermostat based on dry bulb temperature with the automatic switchover between heating and cooling modes based on apparent temperature according to one or more embodiments of the present disclosure.

FIG. 4A depicts the automatic switchover functionality of a conventional thermostat in which the thermostat is configured to activate a heater when the dry bulb temperature falls below a lower dry bulb temperature threshold (e.g., 72.5° F.) and is configured to activate a cooling unit when the dry bulb temperature exceeds an upper dry bulb temperature threshold (e.g., 74.5° F.). Additionally, FIG. 4A depicts a dead band between the upper and lower dry bulb temperature thresholds (e.g., a dead band from a dry bulb temperature of 72.5° F. to a dry bulb temperature of 74.5° F.) in which the thermostat is configured not to activate either the heating unit or the cooling unit if the dry bulb temperature falls within this range.

FIG. 4B depicts the automatic switchover functionality based on apparent temperature according to one or more embodiments of the present disclosure in which the system is configured to activate a heater when the apparent temperature falls below a lower apparent temperature threshold (e.g., the apparent temperature at a dry bulb temperature of 72.5° F. and 45% relative humidity) and is configured to activate a cooling unit when the apparent temperature exceeds an upper apparent temperature threshold (e.g., the apparent temperature at a dry bulb temperature of 74.5° F. and 45% relative humidity). Additionally, FIG. 4B depicts a dead band between the upper and lower apparent temperature thresholds in which the system is configured not to activate either the heating unit or the cooling unit if the apparent temperature (as determined from the measured dry bulb temperature and relative humidity) falls within this range.

FIG. 4C is a graph depicting both the automatic switchover functionality of conventional thermostats based on dry bulb temperature (as shown in FIG. 4A) and the automatic switchover functionality based on apparent temperature according to one or more embodiments of the present disclosure (as shown in FIG. 4B). FIG. 4C illustrates the energy cost savings of the automatic switchover based on apparent temperature compared to the automatic switchover based on dry bulb temperature of conventional thermostats. For instance, Region I indicates the conditions in which a conventional thermostat would activate the heating unit because the dry bulb temperature is below the lower dry bulb temperature threshold (e.g., 72.5° F.), whereas the automatic switchover based on apparent temperature according to the present disclosure would not activate either the cooling unit or the heating unit because the apparent temperature is in the dead band (i.e., the apparent temperature is below the upper apparent temperature threshold and above the lower apparent temperature threshold). Additionally, Region II indicates the conditions in which a conventional thermostat would activate the cooling unit because the dry bulb temperature exceeds the upper dry bulb temperature threshold (e.g., 74.5° F.), whereas the automatic switchover based on apparent temperature according to the present disclosure would not activate either the cooling unit or the heating unit because the apparent temperature is in the dead band (i.e., the apparent temperature is below the upper apparent temperature threshold and above the lower apparent temperature threshold). Accordingly, the automatic switchover between heating and cooling modes based on apparent temperature saves energy compared to a conventional thermostat by not needlessly activating the heating unit or the cooling unit in these conditions.

FIG. 4C also depicts that the automatic switchover control methodology of the present disclosure is configured to provide greater user comfort compared to a conventional thermostat configured to switch between heating and cooling modes based only on dry bulb temperature. For instance, Region III in FIG. 4C indicates the conditions in which a conventional thermostat would activate the heating unit because the dry bulb temperature falls below the lower dry bulb temperature threshold (e.g., 72.5° F.), whereas the automatic switchover based on apparent temperature according to the present disclosure would activate the cooling unit because the apparent temperature, which is a function of both dry bulb temperature and relative humidity, exceeds the upper apparent temperature threshold. Region IV indicates the conditions in which a conventional thermostat would activate the cooling unit because the dry bulb temperature exceeds the upper dry bulb temperature threshold (e.g., 72.5° F.), whereas the automatic switchover based on apparent temperature according to the present disclosure would activate the heating unit because the apparent temperature, which is a function of both dry bulb temperature and relative humidity, is below the lower apparent temperature threshold. Thus, the automatic switchover between heating and cooling modes based on apparent temperature provides greater user comfort compared to a convention thermostat by not activating the wrong unit in these conditions (e.g., not activating the heating unit when the cooling unit should be activated, and not activating the cooling unit when the heating unit should be activated to maintain desired user comfort).

Figure 5:
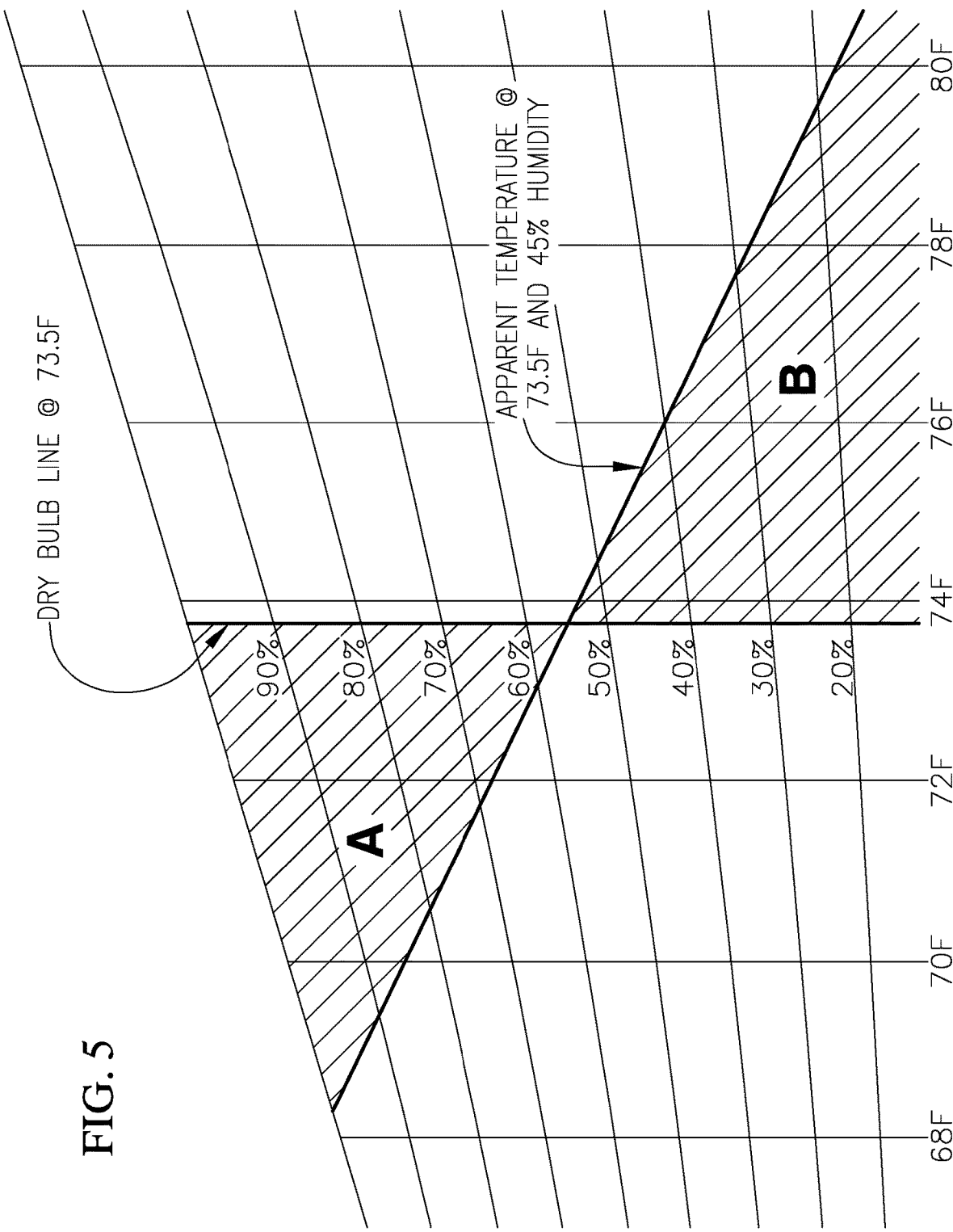
FIG. 5 is a graph comparing the temperature switchover control methodology for conventional thermostats and the temperature switchover control methodology according to one embodiment of the present disclosure without dead bands.

FIG. 5 is a graph comparing the automatic switchover functionality of a conventional thermostat based on dry bulb temperature with the automatic switchover functionality based on apparent temperature according to one or more embodiments of the present disclosure without dead bands. FIG. 5 depicts a single dry bulb temperature threshold (e.g., 73.5° F.). The conventional thermostat is configured to activate a heater when the dry bulb temperature falls below the dry bulb threshold temperature (e.g., 73.5° F.) and is configured to activate a cooling unit when the dry bulb temperature exceeds the dry bulb threshold temperature (e.g., 73.5° F.). FIG. 5 also depicts a single apparent temperature threshold (e.g., the apparent temperature at a dry bulb temperature of 73.5° F. and 45% relative humidity). The automatic switchover based on apparent temperature of the present disclosure is configured to activate a heater when the apparent temperature falls below the apparent temperature threshold (e.g., the apparent temperature at a dry bulb temperature of 73.5° F. and 45% relative humidity) and is configured to activate a cooling unit when the apparent temperature exceeds the threshold apparent temperature (e.g., the apparent temperature at a dry bulb temperature of 73.5° F. and 45% relative humidity). Region A in FIG. 5 indicates the conditions in which a conventional thermostat would activate the heating unit because the dry bulb temperature is below the dry bulb temperature threshold (e.g., 73.5° F.), whereas the automatic switchover based on apparent temperature according to the present disclosure would activate the cooling unit because the apparent temperature, which is a function of both dry bulb temperature and relative humidity, exceeds the apparent temperature threshold (e.g., the apparent temperature at a dry bulb temperature of 73.5° F. and 45% relative humidity). Region B indicates the conditions in which a conventional thermostat would activate the cooling unit because the dry bulb temperature exceeds the dry bulb temperature threshold (e.g., 73.5° F.), whereas the automatic switchover based on apparent temperature according to the present disclosure would activate the heating unit because the apparent temperature, which is a function of both dry bulb temperature and relative humidity, is below the apparent temperature threshold (e.g., the apparent temperature at a dry bulb temperature of 73.5° F. and 45% relative humidity). Thus, the automatic switchover between heating and cooling modes based on apparent temperature provides greater user comfort compared to a convention thermostat by not activating the wrong unit in these conditions. Additionally, as illustrated in FIG. 5, not providing the dead bands creates larger areas of conflict between the automatic switchover based on dry bulb temperature and the automatic switchover based on apparent temperature than when the dead bands are provided (e.g., as illustrated in FIGS. 4A-4C).

The temperature thresholds depicted in FIG. 5 are selected for explanatory purposes only and in no way limit the scope of the present disclosure. Instead, the temperature thresholds may be selected to have any suitable values depending, for instance, on the desired user comfort and/or desired economy. Accordingly, the systems and methods of the present disclosure cover any and all suitable temperature thresholds.

Figure 6:
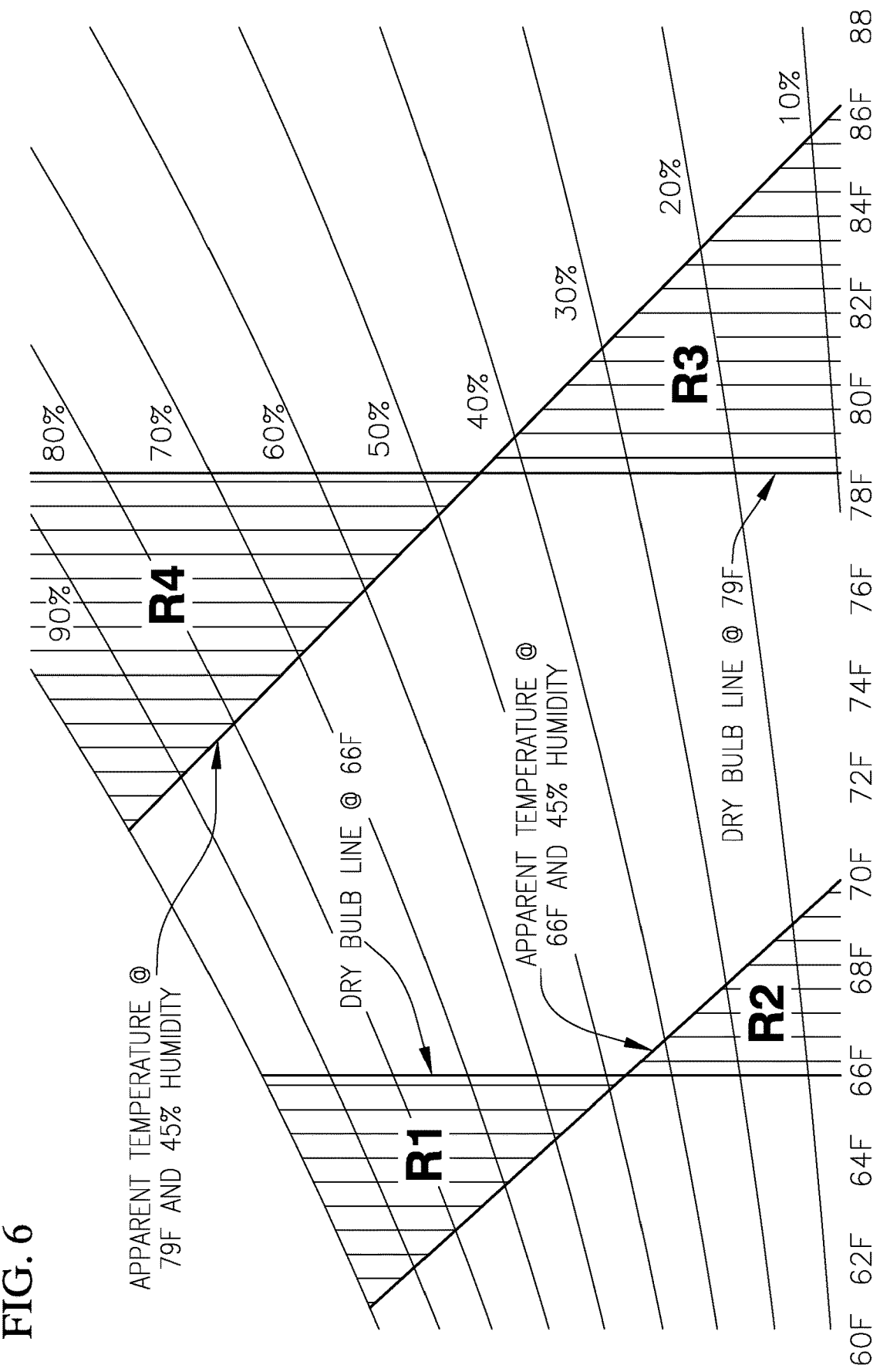
FIG. 6 is a graph comparing the temperature switchover control methodology for conventional thermostats and the temperature switchover control methodology according to one embodiment of the present disclosure with a wide dead zone for maximum energy cost savings.

FIG. 6 is a graph comparing the automatic switchover functionality of a conventional thermostat based on dry bulb temperature with the automatic switchover functionality based on apparent temperature according to one or more embodiments of the present disclosure in which a wide dead zone is provided for maximum energy cost savings. FIG. 6 depicts a lower dry bulb temperature threshold of 66° F. below which the conventional thermostat is configured to activate a heating unit and an upper dry bulb temperature threshold of 79° F. above which the conventional thermostat is configured to activate a cooling unit (i.e., FIG. 6 depicts a dead band from 66° F. to 79° F.). FIG. 6 also depicts a lower apparent temperature threshold at a dry bulb temperature of 66° F. and 45% relative humidity below which the system and method according to one embodiment of the present disclosure is configured to activate a heating unit and an upper apparent temperature threshold at a dry bulb temperature of 79° F. and 45% relative humidity above which the system and method according to one embodiment of the present disclosure is configured to activate a cooling unit (i.e., FIG. 6 depicts a dead band from an apparent temperature at 66° F. and 45% relative humidity to an apparent temperature at 79° F. and 45% relative humidity). Region R1 in FIG. 6 indicates the conditions in which a conventional thermostat would activate the heating unit because the dry bulb temperature is below the lower dry bulb temperature threshold (e.g., 66° F.), whereas the automatic switchover based on apparent temperature according to the present disclosure would not activate either the cooling unit or the heating unit because the apparent temperature is in the dead band (i.e., the apparent temperature is below the upper apparent temperature threshold and above the lower apparent temperature threshold). Additionally, Region R3 in FIG. 6 indicates the conditions in which a conventional thermostat would activate the cooling unit because the dry bulb temperature exceeds the upper dry bulb temperature threshold (e.g., 79° F.), whereas the automatic switchover based on apparent temperature according to the present disclosure would not activate either the cooling unit or the heating unit because the apparent temperature is in the dead band (i.e., the apparent temperature is below the upper apparent temperature threshold and above the lower apparent temperature threshold). Accordingly, the automatic switchover between heating and cooling modes based on apparent temperature saves energy compared to a conventional thermostat by not needlessly activating the heating unit or the cooling unit in these conditions and also achieves greater user comfort.

Region R2 in FIG. 6 indicates the conditions in which a conventional thermostat would not activate either the heating unit or the cooling unit because the dry bulb temperature is in the dead band (e.g., the dry bulb temperature is above the lower dry bulb temperature threshold of 66° F. and below the upper dry bulb temperature threshold of 79° F.), whereas the automatic switchover based on apparent temperature according to the present disclosure would activate the heating unit because the apparent temperature, which is a function of both dry bulb temperature and relative humidity, is below the lower apparent temperature threshold (e.g., the apparent temperature at a dry bulb temperature of 66° F. and 45% relative humidity). Region R4 indicates the conditions in which a conventional thermostat would not activate either the heating unit or the cooling unit because the dry bulb temperature is in the dead band (e.g., the dry bulb temperature is above the lower dry bulb temperature threshold of 66° F. and below the upper dry bulb temperature threshold of 79° F.), whereas the automatic switchover based on apparent temperature according to the present disclosure would activate the cooling unit because the apparent temperature, which is a function of both dry bulb temperature and relative humidity, exceeds the upper apparent temperature threshold (e.g., the apparent temperature at a dry bulb temperature of 79° F. and 45% relative humidity). Thus, the automatic switchover between heating and cooling modes based on apparent temperature provides greater user comfort compared to a convention thermostat which would not activate the heating or cooling units in these conditions.

The upper and lower temperature thresholds of the dead bands depicted in FIGS. 4A-4C and 6 are selected for explanatory purposes only and in no way limit the scope of the present disclosure. Instead, the upper and lower temperature thresholds may be selected to have any suitable values depending, for instance, on the desired user comfort and/or desired economy. Additionally, the systems and methods of the present disclosure cover any and all suitable dead band values, including single dead bands, dual dead bands, and multi dead bands.

Figure 7:
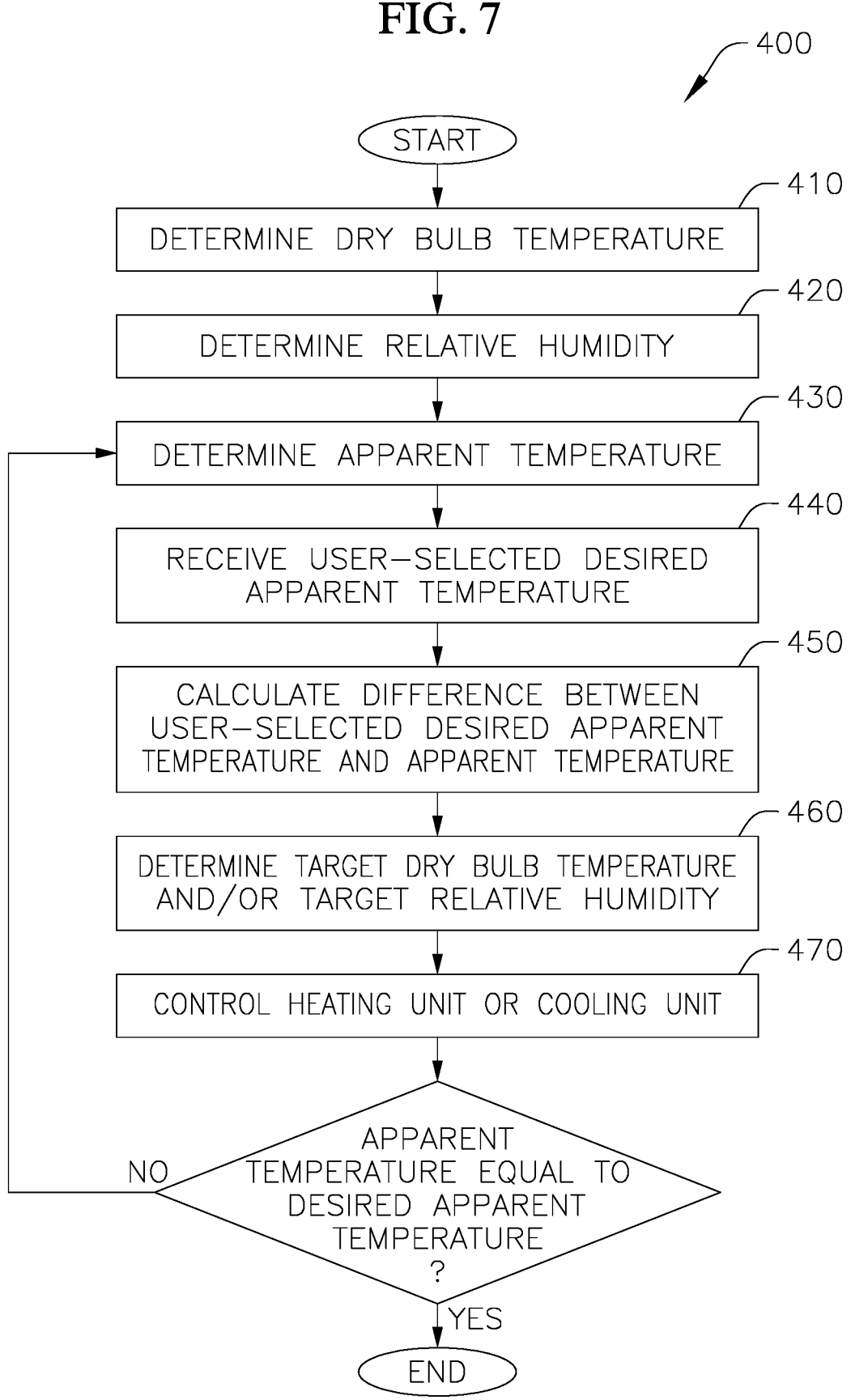
FIG. 7 is a flowchart illustrating tasks of a method of controlling the apparent temperature of a controlled space according to one embodiment of the present disclosure.

FIG. 7 is a flowchart illustrating tasks of a method 400 of controlling the apparent temperature of a controlled space, which is a function of both the dry bulb temperature and the relative humidity of the controlled space, according to one embodiment of the present disclosure. In the illustrated embodiment, the method 400 includes a task 410 of determining a dry bulb temperature of the controlled space. In one embodiment, the task 410 of determining the dry bulb temperature of the controlled space includes measuring the dry bulb temperature with a temperature sensor. In one embodiment, the task 410 may include measuring, with the temperature sensor, the dry bulb temperature continuously or at discrete intervals. Additionally, in one or more embodiments, the task 410 of determining the dry bulb temperature of the controlled space includes averaging the measurements of the dry bulb temperature by the temperature sensor over a predefined time period (e.g., a time period in a range from approximately 1 minute to approximately 15 minutes or more).

In the illustrated embodiment, the method 400 also includes a task 420 of determining a relative humidity of the conditioned space. In one embodiment, the task 420 of determining the relative humidity of the controlled space includes measuring the relative humidity with a humidity sensor. In one embodiment, the task 420 may include measuring, with the humidity sensor, the relative humidity continuously or at discrete intervals. Additionally, in one or more embodiments, the task 420 of determining the relative humidity of the controlled space includes averaging the measurements of the relative humidity by the humidity sensor over a predefined time period (e.g., a time period in a range from approximately 1 minute to approximately 15 minutes or more). In one embodiment, the tasks 410, 420 of averaging the measurements of the relative humidity and the measurements of dry bulb temperature may be performed over the same predefined time period.

In the illustrated embodiment, the method 400 also includes a task 430 of determining the actual apparent temperature of the conditioned space based on the dry bulb temperature of the conditioned space determined in task 410 and the relative humidity of the conditioned spaced determined in task 420. In one embodiment, the task 430 of determining the actual apparent temperature of the conditioned space includes referencing a lookup table (e.g., the lookup tables illustrated in FIGS. 2A-2B) that lists the apparent temperature corresponding to the determined dry bulb temperature and the determined relative humidity. In one embodiment, the task 430 of determining the actual apparent temperature of the conditioned space includes calculating the apparent temperature from a semi-empirical algebraic equation(s) that defines the apparent temperature as a function of dry bulb temperature and relative humidity (e.g., calculating the apparent temperature from Equations 1 and 2 above).

In the illustrated embodiment, the method 400 also includes a task 440 of receiving a user-selected desired apparent temperature of the conditioned space. In one or more embodiments, the user-selected desired apparent temperature may be input through any suitable input device, such as, for instance, a remote control, an application on a portable electronic device (e.g., a smartphone), one or more physical controls (e.g., one or more buttons, sliders, and/or knobs), and/or an icon displayed on a touch screen display. In one or more embodiments, user-selected desired apparent temperature may be the current apparent temperature in the conditioned space (e.g., when the user desires to maintain the current apparent temperature in the conditioned space without specifying a particular desired apparent temperature).

In the illustrated embodiment, the method 400 also includes a task 450 of calculating a difference between the user-selected desired apparent temperature received in task 440 and the actual apparent temperature of the space determined in task 430.

In one or more embodiments, the method 400 also includes a task 460 of determining (e.g., calculating) the target dry bulb temperature that corresponds to the desired apparent temperature and the current relative humidity in the controlled space, and/or determining (e.g., calculating) the target relative humidity that corresponds to the desired apparent temperature and the current dry bulb temperature in the controlled space. In one embodiment, the task 460 includes determining the target dry bulb temperature by referencing a lookup table that lists dry bulb temperature as a function of the user-selected desired apparent temperature and relative humidity (e.g., the lookup tables in FIGS. 3A-3B). In one embodiment, the task 460 includes calculating the target dry bulb temperature from an equation defining the dry bulb temperature as a function of the desired apparent temperature and the relative humidity (e.g., calculating the dry bulb temperature from Equation 3 above). In one embodiment, the task 460 includes determining the target relative humidity by referencing a lookup table that lists relative humidity as a function of the desired apparent temperature and dry bulb temperature. In one embodiment, the task 460 includes calculating the target relative humidity from an equation defining the relative humidity as a function of the desired apparent temperature and the dry bulb temperature.

In one embodiment, the method 400 also includes a task 470 of controlling an air-conditioning unit and/or a heating unit to change the dry bulb temperature and/or the humidity in the conditioned space until the apparent temperature in the conditioned space is equal or substantially equal to the user-selected desired apparent temperature received in task 440. The task 470 of controlling the air-conditioning unit may include controlling a relay (e.g., a switch) to cause the air-conditioning unit to start and stop, controlling (e.g., varying) the speed of a compressor in the air-conditioning unit, and/or regulating a control valve of the air-conditioning unit. In one embodiment, the task 470 includes controlling the air-conditioning unit and/or the heating unit to decrease or increase the dry bulb temperature in the conditioned space until the dry bulb temperature measured by the temperature sensor is equal or substantially equal to the target dry bulb temperature determined in task 460. In one embodiment, the task 470 includes controlling the air-conditioning unit to decrease or increase the relative humidity in the conditioned space until the relative humidity measured by the humidity sensor is equal or substantially equal to the target relative humidity determined in task 460. In one or more embodiments, the task 470 may include changing the refrigerant temperature of the air-conditioning unit to change the relative humidity in the conditioned space (e.g., lowering the refrigerant temperature of the air-conditioning unit to decrease the relative humidity in the space or increasing the refrigerant temperature of the air-conditioning unit to increase the relative humidity in the space). The task of lowering the refrigerant temperature of the air-conditioning may include decreasing the airflow through an evaporator of the air-conditioning unit and/or reducing the expansion valve capacity (if the air-conditioning unit includes a direct expansion evaporator) or reducing the refrigerant medium temperature (if the air-conditioning unit includes a fan coil). Increasing the refrigerant temperature of the air-conditioning unit may be performed by increasing the airflow through the evaporator of the air-conditioning unit and/or increasing the expansion valve capacity (if the air-conditioning unit includes a direct expansion evaporator) or increasing the refrigerant medium temperature (if the air-conditioning unit includes a fan coil). In one or more embodiments, the task 470 may include controlling the air-conditioning unit and/or the heating unit to vary both the dry bulb temperature and the relative humidity in the conditioned space to achieve the desired apparent temperature in the controlled space.

In one or more embodiments, the tasks 430, 440, 450, 460, 470 of determining the apparent temperature, receiving the user-selected desired apparent temperature, calculating the difference between the user-selected desired apparent temperature and the actual apparent temperature of the space, determining (e.g., calculating) the target dry bulb temperature and/or the target relative humidity, and controlling the air-conditioning unit and/or the heating unit to change the dry bulb temperature and/or the humidity in the conditioned space until the apparent temperature in the conditioned space is equal or substantially equal to the user-selected desired apparent temperature may be repeatedly (e.g., continuously or at predefined intervals) performed to maintain the user-selected desired apparent temperature in the conditioned space even if factors or variables affecting the relative humidity and/or the dry bulb temperature in the controlled space change, such as the outside temperature, weather conditions, room occupancy, and/or radiative heat loads.

Figure 8:
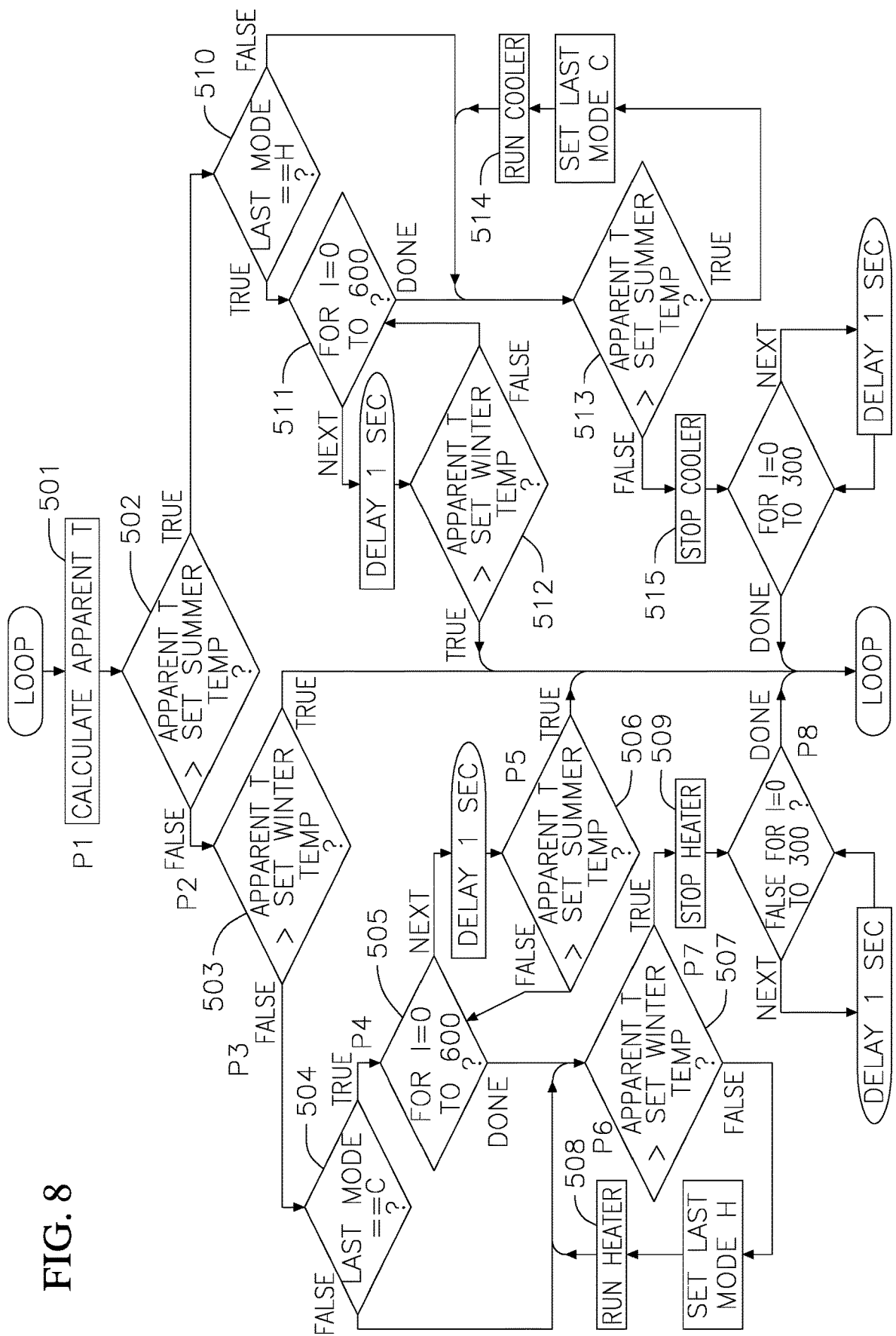
FIG. 8 is a flowchart depicting tasks of an algorithm configured to control switchover between heating and cooling modes according to one embodiment of the present disclosure.

FIG. 8 is a flowchart depicting tasks of an algorithm configured to control switchover between heating and cooling modes according to one embodiment of the present disclosure. The left hand side of the flowchart depicts the tasks associated with operating in a heating mode, and the right hand side of the flowchart depicts the tasks associated with operating in a cooling mode. As illustrated in FIG. 8, the algorithm includes a task 501 of determining the actual apparent temperature of a conditioned space based on the dry bulb temperature of the conditioned space (e.g., as measured by a temperature sensor) and the relative humidity of the conditioned spaced (e.g., as measured by a humidity sensor). In one embodiment, the task 501 of determining the actual apparent temperature of the conditioned space includes referencing a lookup table (e.g., the lookup tables illustrated in FIGS. 2A-2B) that lists the apparent temperature corresponding to the determined dry bulb temperature and the determined relative humidity. In one embodiment, the task 501 of determining the actual apparent temperature of the conditioned space includes calculating the apparent temperature from a semi-empirical algebraic equation(s) that defines the apparent temperature as a function of dry bulb temperature and relative humidity (e.g., calculating the apparent temperature from Equations 1 and 2 above).

The algorithm also includes a task 502 of comparing the actual apparent temperature of the conditioned space determined in task 501 to an upper apparent temperature limit or threshold (e.g., a set summer apparent temperature limit). The upper apparent temperature limit may be input by a user or may be determined from a dead band area calculated based on the user-selected desired apparent temperature. If the actual apparent temperature determined in task 501 is not greater than the upper apparent temperature limit (e.g., the actual apparent temperature is less than the upper apparent temperature limit), the algorithm includes a task 503 of comparing the actual apparent temperature determined in task 501 to a lower apparent temperature limit or threshold (e.g., a set winter apparent temperature limit). If, as determined in task 503, the actual apparent temperature determined in task 501 is greater than the lower apparent temperature threshold, then the algorithm repeats the loop of comparing the actual apparent temperature against the upper and lower apparent temperature thresholds because the actual apparent temperature is in a dead band between the upper and lower apparent temperature thresholds.

If the actual apparent temperature determined in task 501 is not greater than the lower apparent temperature limit (e.g., the actual apparent temperature is less than the lower apparent temperature limit), then the algorithm includes a task 504 of determining if the last mode operated by the system was the cooling mode (e.g., Last mode=cooling "C"). If the algorithm determines, in task 504, that the last mode was the cooling mode, then the algorithm includes a task 505 of executing a delay of a predetermined time period (e.g., 10 minutes) before changing from the cooling mode to the heating mode. Additionally, in the illustrated embodiment, the algorithm includes a task 506 of determining if the actual apparent temperature determined in task 501 is greater than the upper apparent temperature limit, which, if true, is an indication that the conditioned space is being heated either by an internal heat source or by the outside weather or the previous drop in temperature was due to an undershoot from the cooling mode, which would indicate that the system should return to the cooling mode. Accordingly, the task 506 of the algorithm is configured to prevent triggering an unnecessary heating mode.

Following the task 505 of executing the time delay, the algorithm includes a task 507 of determining if the apparent temperature of the conditioned space is still not greater than the lower apparent temperature threshold (e.g., less than the lower apparent temperature threshold). If the apparent temperature of the conditioned space is still not greater than the lower apparent temperature threshold (e.g., less than the lower apparent temperature threshold), then the algorithm includes a task 508 of activating the heating unit. Following the task 508 of activating the heater, the algorithm will repeat task 507 to determine if the apparent temperature is greater than the lower apparent temperature threshold. If it is determined in task 507 that the apparent temperature is greater than the lower apparent temperature threshold following the task 508 of activating the heating unit, then the algorithm includes a task 509 of stopping the heating unit. In one or more embodiments, the algorithm includes an anti-short cycle timer configured to delay any operation by a set period of time (e.g., 5 minutes).

If the apparent temperature is greater than the upper apparent temperature threshold, as determined in task 502, then the algorithm includes a task 510 of determining if the last mode was the heating mode (e.g., Last mode=heating "H"). If the algorithm determines, in task 510, that the last mode was the heating mode, then the algorithm includes a task 511 of executing a delay of a predetermined time period (e.g., 10 minutes) before changing from the heating mode to the cooling mode. Additionally, in the illustrated embodiment, the algorithm includes a task 512 of determining if the actual apparent temperature determined in task 501 is less than the lower apparent temperature limit, which, if true, is an indication that the conditioned space is being cooled by the outside weather or the previous increase in temperature was due to an overshoot from the heating mode, which would indicate that the system should return to the heating mode. This task 512 of the algorithm is configured to prevent triggering an unnecessary cooling mode.

Following the task 511 of executing the time delay, the algorithm includes a task 513 of determining if the apparent temperature of the conditioned space is still greater than the upper apparent temperature threshold. If the apparent temperature of the conditioned space is still greater than the upper apparent temperature threshold, then the algorithm includes a task 514 of activating the cooling unit. Following the task 514 of activating the cooling unit, the algorithm will repeat task 513 to determine if the apparent temperature is greater than the upper apparent temperature threshold. If it is determined in task 513 that the apparent temperature is not greater than the upper apparent temperature threshold (e.g., the apparent temperature is less than the upper apparent temperature threshold) following the task 514 of activating the cooling unit, then the algorithm includes a task 515 of stopping the cooling unit. In one or more embodiments, the algorithm includes an anti-short cycle timer configured to delay any operation by a set period of time (e.g., 5 minutes). The above-described tasks can be repeatedly performed (e.g., continuously or at regular intervals) to maintain the user-selected desired apparent temperature or to maintain the apparent temperature within a dead band around the user-selected desired apparent temperature.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof. As used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "coupled" to another component, it can be directly attached to the other component or intervening components may be present therebetween.

What is claimed is:

1. A climate control system configured to control a heating unit and a cooling unit, the climate control system comprising:

a temperature sensor configured to measure a current dry bulb temperature;
a humidity sensor configured to measure a current relative humidity;
a processor; and
a non-transitory computer-readable storage medium operably coupled to the processor, the non-transitory computer-readable storage medium having software instructions stored therein, which, when executed by the processor, cause the processor to:
determine a current apparent temperature based on at least the current dry bulb temperature measured by the temperature sensor and the current relative humidity measured by the humidity sensor;
receive a user-selected desired apparent temperature;
activate the heating unit in a heating mode when the current apparent temperature is below a lower apparent temperature threshold below the user-selected desired apparent temperature, wherein the lower apparent temperature threshold is a constant based on the user-selected desired apparent temperature;
activate the cooling unit in a cooling mode when the current apparent temperature is above an upper apparent temperature threshold above the user-selected desired apparent temperature, wherein the upper apparent temperature threshold is a constant based on the user-selected desired apparent temperature; and
not activate either the cooling unit or the heating unit when the current apparent temperature is in a dead band between the lower apparent temperature threshold and the upper apparent temperature threshold,
wherein the software instructions, when executed by the processor, cause the processor to automatically switch between the heating mode and the cooling mode,
wherein each of the user-selected desired apparent temperature, the lower apparent temperature threshold, and the upper apparent temperature threshold is based on a combination of a respective dry bulb temperature and a corresponding relative humidity.

2. The system of claim 1, wherein the software instructions comprise a lookup table, and wherein the software instructions, when executed by the processor, cause the processor to determine the current apparent temperature from the lookup table.

3. The system of claim 1, wherein the software instructions comprise a semi-empirical algebraic equation defining the current apparent temperature, and wherein the software instructions, when executed by the processor, cause the processor to calculate the current apparent temperature from the semi-empirical algebraic equation.

4. The system of claim 3, wherein the semi-empirical algebraic equation is $$AT = T_a + 0.33*\rho - 0.70*ws - 4.00,$$

wherein $$\rho = rh*6.105*e^{\left(17.27*\frac{T_a}{237.7+T_a}\right)}$$

where AT is the apparent temperature in ° C.; Ta is the dry bulb temperature in ° C.; ρ is the water vapor pressure (hPa); ws is the wind speed; and rh is the relative humidity (%).

5. The system of claim 1, wherein the software instructions, when executed by the processor, further cause the processor to calculate a target dry bulb temperature corresponding to the user-selected desired apparent temperature and the current relative humidity.

6. The system of claim 5, wherein the software instructions comprise a polynomial equation, and wherein the software instructions, when executed by the processor, cause the processor to calculate the target dry bulb temperature from the polynomial equation.

7. The system of claim 1, wherein the software instructions, when executed by the processor, further cause the processor to calculate a target relative humidity corresponding to the user-selected desired apparent temperature and the current dry bulb temperature.

8. The system of claim 1, further comprising an input unit configured to input the user-selected desired apparent temperature.

9. The system of claim 8, wherein the input unit is configured to cause the processor to calculate the current apparent temperature and cause the processor to set the lower apparent temperature threshold equal to the current apparent temperature when the system is operating in the heating mode and to set the upper apparent temperature threshold equal to the current apparent temperature when the system is operating in the cooling mode.

10. The system of claim 1, further comprising a display configured to display at least one of the current dry bulb temperature, the current relative humidity, the current apparent temperature, and the user-selected desired apparent temperature.

11. The system of claim 1, wherein non-transitory computer-readable storage medium is configured to store a first user-selected desired apparent temperature associated with a first user, and store a second user-selected desired apparent temperature associated with a second user.

12. The climate control system of claim 1, wherein:
the lower apparent temperature threshold is a curve defined by a plurality of combinations of dry bulb temperature and relative humidity that achieve a constant lower apparent temperature, and
the upper apparent temperature threshold is a curve defined by a plurality of combinations of dry bulb temperature and relative humidity that achieve a constant upper apparent temperature.

13. A climate control system configured to control a heating unit and a cooling unit, the climate control system comprising:
a temperature sensor configured to measure a current dry bulb temperature;
a humidity sensor configured to measure a current relative humidity;
a processor; and
a non-transitory computer-readable storage medium operably coupled to the processor, the non-transitory computer-readable storage medium having software instructions stored therein, which, when executed by the processor, cause the processor to:
determine a current apparent temperature based on at least the current dry bulb temperature measured by the temperature sensor and the current relative humidity measured by the humidity sensor;
receive a user-selected desired apparent temperature;
activate the heating unit in a heating mode when the current apparent temperature is below a lower apparent temperature threshold based on the user-selected desired apparent temperature; and
activate the cooling unit in a cooling mode when the current apparent temperature is above an upper apparent temperature threshold based on the user-selected desired apparent temperature, wherein the software instructions, when executed by the processor, cause the processor to automatically switch between the heating mode and the cooling mode, wherein the software instructions, when executed by the processor, further cause the processor to calculate a target dry bulb temperature corresponding to the user-selected desired apparent temperature and the current relative humidity, wherein the software instructions comprise a polynomial equation, and wherein the software instructions, when executed by the processor, cause the processor to calculate the target dry bulb temperature from the polynomial equation, wherein the polynomial equation is $-0.002227*AT^2+1.06*AT+3.4902*RH^2-3.6014*RH-0.33346*AT*RH+4.0937$, where AT is the user-selected desired apparent temperature and RH is the current relative humidity.

14. A method of controlling the climate of a conditioned space, the method comprising:
   determining a current dry bulb temperature of the conditioned space;
   determining a current relative humidity of the conditioned space;
   calculating or determining a current apparent temperature of the conditioned space based on at least the current relative humidity and the current dry bulb temperature of the conditioned space;
   activating a heating unit in a heating mode when the current apparent temperature is below a lower apparent temperature threshold below a user-selected desired apparent temperature, wherein the lower apparent temperature threshold is a constant based on the user-selected desired apparent temperature;
   activating a cooling unit in a cooling mode when the current apparent temperature is above an upper apparent temperature threshold above the user-selected desired apparent temperature, wherein the upper apparent temperature threshold is a constant based on the user-selected desired apparent temperature;
   not activating either the cooling unit or the heating unit when the current apparent temperature is in a dead band between the lower apparent temperature threshold and the upper apparent temperature threshold; and
   automatically switching between the heating mode and the cooling mode,
   wherein each of the user-selected desired apparent temperature, the lower apparent temperature threshold, and the upper apparent temperature threshold is based on a combination of a respective dry bulb temperature and a corresponding relative humidity.

15. The method of claim 14, wherein the determining the current dry bulb temperature comprises measuring the current dry bulb temperature with a temperature sensor, and wherein the determining the current relative humidity comprises measuring the current relative humidity with a humidity sensor.

16. The method of claim 14, further comprising receiving the user-selected desired apparent temperature of the conditioned space.

17. The method of claim 16, further comprising determining a difference between the user-selected desired apparent temperature and the current apparent temperature of the conditioned space.

18. The method of claim 17, further comprising determining a target dry bulb temperature corresponding to the user-selected desired apparent temperature and the current relative humidity in the conditioned space.

19. The method of claim 18, wherein the determining the target dry bulb temperature comprises calculating the target dry bulb temperature from a polynomial equation, and wherein the polynomial equation is $-0.002227*AT^2+1.06*AT+3.4902*RH^2-3.6014*RH-0.33346*AT*RH+4.0937$, where AT is the user-selected desired apparent temperature and RH is the current relative humidity.

20. The method of claim 17, further comprising determining a target relative humidity corresponding to the user-selected desired apparent temperature and the current dry bulb temperature in the conditioned space.

21. The method of claim 14, wherein the calculating or determining the current apparent temperature comprises determining the current apparent temperature from a lookup table.

22. The method of claim 14, wherein the calculating or determining the apparent temperature comprises calculating the current apparent temperature with a semi-empirical algebraic equation.

23. The method of claim 22, wherein the semi-empirical algebraic equation is $$AT = T_a + 0.33*\rho - 0.70*ws - 4.00,$$

wherein $$\rho = rh*6.105*e^{\left(17.27*\frac{T_a}{237.7+T_a}\right)}$$

where AT is the Apparent Temperature in °C.; Ta is the dry bulb temperature in °C.; p is the water vapor pressure (hPa); ws is the wind speed; and rh is the relative humidity (%).

24. The method of claim 14, wherein the calculating or determining the current apparent temperature is based on one or more additional factors selected from the group consisting of radiated heat loads, outside temperature, a season, activity level, clothing, radiation, and wind speed.

25. The method of claim 14, wherein:
   the lower apparent temperature threshold is a curve defined by a plurality of combinations of dry bulb temperature and relative humidity that achieve a constant lower apparent temperature, and
   the upper apparent temperature threshold is a curve defined by a plurality of combinations of dry bulb temperature and relative humidity that achieve a constant upper apparent temperature.

26. A non-transitory computer-readable storage medium having software instructions stored therein, which, when executed by a processor, cause the processor to:
   determine a current dry bulb temperature;
   determine a current relative humidity;
   determine a current apparent temperature based on the current dry bulb temperature and the current relative humidity;
   receive a user-selected desired apparent temperature;
   activate a heating unit in a heating mode when the current apparent temperature is below a lower apparent temperature threshold below the user-selected desired apparent temperature, wherein the lower apparent temperature threshold is a constant based on the user-selected desired apparent temperature;

activate a cooling unit in a cooling mode when the current apparent temperature is above an upper apparent temperature threshold above the user-selected desired apparent temperature, wherein the upper apparent temperature threshold is a constant based on the user-selected desired apparent temperature;

not activate either the cooling unit or the heating unit when the current apparent temperature is in a dead band between the lower apparent temperature threshold and the upper apparent temperature threshold; and automatically switch between the heating mode and the cooling mode, wherein each of the user-selected desired apparent temperature, the lower apparent temperature threshold, and the upper apparent temperature threshold is based on a combination of a respective dry bulb temperature and a corresponding relative humidity.

27. The non-transitory computer-readable storage medium of claim 26, wherein:

the lower apparent temperature threshold is a curve defined by a plurality of combinations of dry bulb temperature and relative humidity that achieve a constant lower apparent temperature, and the upper apparent temperature threshold is a curve defined by a plurality of combinations of dry bulb temperature and relative humidity that achieve a constant upper apparent temperature.

* * * * *